(12) United States Patent
ElBsat et al.

(10) Patent No.: US 9,256,702 B2
(45) Date of Patent: Feb. 9, 2016

(54) SYSTEMS AND METHODS FOR DETERMINING AN APPROPRIATE MODEL PARAMETER ORDER

(71) Applicant: Johnson Controls Technology Company, Holland, MI (US)

(72) Inventors: Mohammad N. ElBsat, Milwaukee, WI (US); Michael J. Wenzel, Oak Creek, WI (US)

(73) Assignee: Johnson Controls Technology Company, Holland, MI (US)

( * ) Notice: Subject to any disclaimer, the term of this patent is extended or adjusted under 35 U.S.C. 154(b) by 9 days.

(21) Appl. No.: 14/133,310

(22) Filed: Dec. 18, 2013

(65) Prior Publication Data

US 2015/0169795 A1    Jun. 18, 2015

(51) Int. Cl.
*G06F 7/60* (2006.01)
*G06F 17/10* (2006.01)
*G06F 17/50* (2006.01)

(52) U.S. Cl.
CPC ........ *G06F 17/5009* (2013.01); *G06F 17/5004* (2013.01)

(58) Field of Classification Search
None
See application file for complete search history.

(56) References Cited

U.S. PATENT DOCUMENTS

| | | | |
|---|---|---|---|
| 8,532,808 B2 | 9/2013 | Drees et al. | |
| 2011/0130886 A1 | 6/2011 | Drees et al. | |
| 2011/0257911 A1 | 10/2011 | Drees et al. | |
| 2012/0084063 A1 | 4/2012 | Drees et al. | |
| 2012/0259583 A1 | 10/2012 | Noboa et al. | |
| 2012/0278038 A1* | 11/2012 | An et al. ................ 702/181 |
| 2013/0085614 A1 | 4/2013 | Wenzel et al. | |
| 2013/0086010 A1 | 4/2013 | Wenzel et al. | |
| 2013/0325377 A1 | 12/2013 | Drees et al. | |

FOREIGN PATENT DOCUMENTS

WO    WO-2011/100255 A3    8/2011

* cited by examiner

*Primary Examiner* — Omar Fernandez Rivas
*Assistant Examiner* — Bernard E Cothran
(74) *Attorney, Agent, or Firm* — Foley & Lardner LLP

(57) ABSTRACT

Systems and methods for determining an appropriate parameter order for a building energy use model are provided. A described method includes receiving an energy use model for a building site, obtaining a plurality of data points, calculating a first regression statistic indicating a fit of the energy use model to the plurality of data points under a null hypothesis and a second regression statistic indicating a fit of the energy use model to the plurality of data points under an alternative hypothesis, and comparing a test statistic to a threshold value. The test statistic is a function of the first regression statistic and the second regression statistic. The method further includes determining an appropriate parameter order for the energy use model based on a result of the comparison.

33 Claims, 5 Drawing Sheets

SYSTEMS AND METHODS FOR DETERMINING AN APPROPRIATE MODEL PARAMETER ORDER

BACKGROUND

The present disclosure relates generally to systems and methods for analyzing energy consumption model data. The present disclosure relates more particularly to systems and methods for determining an appropriate number of parameters (e.g., regression coefficients and/or balance point parameters) for a building energy use model.

Many buildings are equipped with a variety of energy-consuming equipment and devices. For example, a building may be equipped with heating, ventilation, and air conditioning (HVAC) equipment that consume energy to regulate the temperature, humidity, and/or air quality in the building. Other exemplary types of energy-consuming building equipment include lighting fixtures, security equipment, data networking infrastructure, and other such equipment.

The energy efficiency of buildings has become an area of interest in recent years. For an energy provider, a high energy efficiency of the buildings that it services helps to alleviate strains placed on the energy provider's electrical generation and transmission assets. For a building operator, a high energy efficiency corresponds to greater financial savings because less energy is consumed by the building.

One way to improve the energy efficiency of a building is through an accurate model of the building's energy use. An energy use model for a building typically predicts the building's total energy consumption as a function of one or more predictor variables and one or more model parameters. The number and type of parameters included in the energy use model may depend on the physical location of the building and other characteristics of the building site. It is often difficult and challenging to accurately determine an appropriate parameter order for a building energy use model.

SUMMARY

One implementation of the present disclosure is a method for determining an appropriate parameter order for an energy use model for a building site. The method includes receiving an energy use model for a building site. The energy use model may include a weather-related predictor variable. The method further includes obtaining a plurality of data points. Each of the data points may include a value of the weather-related predictor variable and an associated energy consumption value for the building site. The method further includes calculating a first regression statistic indicating a fit of the energy use model to the plurality of data points under a null hypothesis, calculating a second regression statistic indicating a fit of the energy use model to the plurality of data points under an alternative hypothesis, and comparing a test statistic to a threshold value. The test statistic is a function of the first regression statistic and the second regression statistic. The method further includes determining an appropriate parameter order for the energy use model based on a result of the comparison.

In some embodiments, obtaining the plurality of data points includes, for each of the data points, receiving at least one of an observed temperature value and an observed enthalpy value and calculating the value of the weather-related predictor variable using the observed temperature value or the observed enthalpy value. In some embodiments, the weather-related predictor variable is at least one of cooling degree days, heating degree days, cooling energy days, heating energy days, temperature, and enthalpy.

In some embodiments, the energy use model includes a balance point parameter under the alternative hypothesis and does not include a balance point parameter under the null hypothesis. In some embodiments, the balance point parameter is at least one of a temperature parameter having a temperature value between a minimum and a maximum of a plurality of observed temperature values and an enthalpy parameter having an enthalpy value between a minimum and a maximum of a plurality of observed enthalpy values. In some embodiments, the value of the weather-related predictor variable is a function of the balance point parameter. In some embodiments, the energy use model under the null hypothesis is nested within the energy use model under the alternative hypothesis. For example, under the alternative hypothesis, the energy use model may use an extra parameter (i.e., a balance point parameter) relative to the energy use model under the null hypothesis. The balance point parameter may contribute to the energy consumption predicted by the energy use model by affecting the value of the weather-related predictor variable without appearing explicitly in the energy use model.

In some embodiments, the first regression statistic is a sum of squared error under the null hypothesis and the second regression statistic is a sum of squared error under the alternative hypothesis. The sum of squared error may be a function of a difference between an energy consumption of the building site predicted by the energy use model and an actual energy consumption of the building site.

In some embodiments, the test statistic is a ratio of (a) an improvement between the first regression statistic and the second regression statistic to (b) the second regression statistic divided by a number of degrees of freedom of the second regression statistic.

In some embodiments, the method further includes identifying a significance level and calculating the threshold value. The threshold value may be a function of the identified significance level. In some embodiments, the function of the identified significance level is an inverse F-distribution function based on the identified significance level, a number of degrees of freedom of the second regression statistic, and a difference between a number of degrees of freedom of the first regression statistic and the number of degrees of freedom of the second regression statistic.

In some embodiments, determining the appropriate parameter order for the energy use model includes rejecting the null hypothesis if the result of the comparison reveals that test statistic is not less than the threshold value and failing to reject the null hypothesis if the result of the comparison reveals that the test statistic is less than the threshold value. In some embodiments, determining the appropriate parameter order for the energy use model includes determining that a three-parameter model is appropriate in response to rejecting the null hypothesis and determining that a two-parameter model is appropriate in response to failing to reject the null hypothesis. In some embodiments, determining an appropriate parameter order for the energy use model includes identifying the building site as at least one of a building site for which heating is not required and a building site for which cooling is not required in response to failing to reject the null hypothesis.

In some embodiments, the method further includes identifying a current parameter order of the energy use model, comparing the current parameter order with the appropriate parameter order, updating the energy use model with an energy use model having the appropriate parameter order in response to the current parameter order not matching the appropriate parameter order, and storing the energy use model for the building site. The stored energy use model may have the appropriate parameter order.

In some embodiments, the method further includes using the stored energy use model to perform a peer analysis of energy use model parameters for a class of buildings, calculating a difference between an energy use model parameter of the stored energy use model and a mean of the energy use model parameters of the class of buildings, and detecting an outlier model parameter based on a result of the calculation.

In some embodiments, the method further includes monitoring changes to one or more energy use model parameters in the stored energy use model, detecting the existence of a fault condition using a monitored change to the energy use model parameters, and determining a change to an energy consumption that results from the fault condition based on the change to the energy use model parameters.

In some embodiments, the method further includes updating the energy use model with an energy use model having the appropriate parameter order, applying inputs to the updated energy use model, conducting a performance analysis using the updated energy use model, and providing an output using a result of the performance analysis.

Another implementation of the present disclosure is a system for determining an appropriate parameter order for an energy use model for a building site. The system includes a communications interface configured to receive an energy use model for a building site. The energy use model may include a weather-related predictor variable. The system further includes a processing circuit configured to obtain a plurality of data points, calculate a first regression statistic indicating a fit of the energy use model to the plurality of data points under a null hypothesis, and calculate a second regression statistic indicating a fit of the energy use model to the plurality of data points under an alternative hypothesis. Each of the data points may include a value of the weather-related predictor variable and an associated energy consumption value for the building site. The processing circuit is further configured to compare a test statistic to a threshold value and to determine an appropriate parameter order for the energy use model based on a result of the comparison. The test statistic is a function of the first regression statistic and the second regression statistic.

In some embodiments, obtaining the plurality of data points includes, for each of the data points, receiving at least one of an observed temperature value and an observed enthalpy value and calculating the value of the weather-related predictor variable using the observed temperature value or the observed enthalpy value. In some embodiments, the weather-related predictor variable is at least one of cooling degree days, heating degree days, cooling energy days, heating energy days, temperature, and enthalpy.

In some embodiments, the energy use model includes a balance point parameter under the alternative hypothesis and does not include a balance point parameter under the null hypothesis. In some embodiments, the balance point parameter is at least one of a temperature parameter having a temperature value between a minimum and a maximum of a plurality of observed temperature values and an enthalpy parameter having an enthalpy value between a minimum and a maximum of a plurality of observed enthalpy values. In some embodiments, the value of the weather-related predictor variable is a function of the balance point parameter. In some embodiments, the energy use model under the null hypothesis is nested within the energy use model under the alternative hypothesis.

In some embodiments, the first regression statistic is a sum of squared error under the null hypothesis and the second regression statistic is a sum of squared error under the alternative hypothesis. The sum of squared error may be a function of a difference between an energy consumption of the building site predicted by the energy use model and an actual energy consumption of the building site.

In some embodiments, the test statistic is a ratio of (a) an improvement between the first regression statistic and the second regression statistic to (b) the second regression statistic divided by a number of degrees of freedom of the second regression statistic.

In some embodiments, the processing circuit is further configured to identify a significance level and calculate the threshold value. The threshold value may be a function of the identified significance level. In some embodiments, the function of the identified significance level is an inverse F-distribution function based on the identified significance level, a number of degrees of freedom of the second regression statistic, and a difference between a number of degrees of freedom of the first regression statistic and the number of degrees of freedom of the second regression statistic.

In some embodiments, determining the appropriate parameter order for the energy use model includes rejecting the null hypothesis if the result of the comparison reveals that test statistic is not less than the threshold value and failing to reject the null hypothesis if the result of the comparison reveals that the test statistic is less than the threshold value. In some embodiments, determining the appropriate parameter order for the energy use model includes determining that a three-parameter model is appropriate in response to rejecting the null hypothesis and determining that a two-parameter model is appropriate in response to failing to reject the null hypothesis. In some embodiments, determining an appropriate parameter order for the energy use model includes identifying the building site as at least one of a building site for which heating is not required and a building site for which cooling is not required in response to failing to reject the null hypothesis.

In some embodiments, the processing circuit is further configured to identify a current parameter order of the energy use model, compare the current parameter order with the appropriate parameter order, update the energy use model with an energy use model having the appropriate parameter order in response to the current parameter order not matching the appropriate parameter order, and store the energy use model for the building site. The stored energy use model may have the appropriate parameter order.

In some embodiments, the processing circuit is further configured to use the stored energy use model to perform a peer analysis of energy use model parameters for a class of buildings, calculate a difference between an energy use model parameter of the stored energy use model and a mean of the energy use model parameters of the class of buildings, and detect an outlier model parameter based on a result of the calculation.

In some embodiments, the processing circuit is further configured to monitor changes to one or more energy use model parameters in the stored energy use model, detect the existence of a fault condition using a monitored change to the energy use model parameters, and determine a change to an energy consumption that results from the fault condition based on the change to the energy use model parameters.

In some embodiments, the processing circuit is further configured to update the energy use model with an energy use model having an appropriate parameter order, apply inputs to the updated energy use model, conduct a performance analysis using the updated energy use model, and provide an output using a result of the performance analysis.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

DETAILED DESCRIPTION

Figure 1:
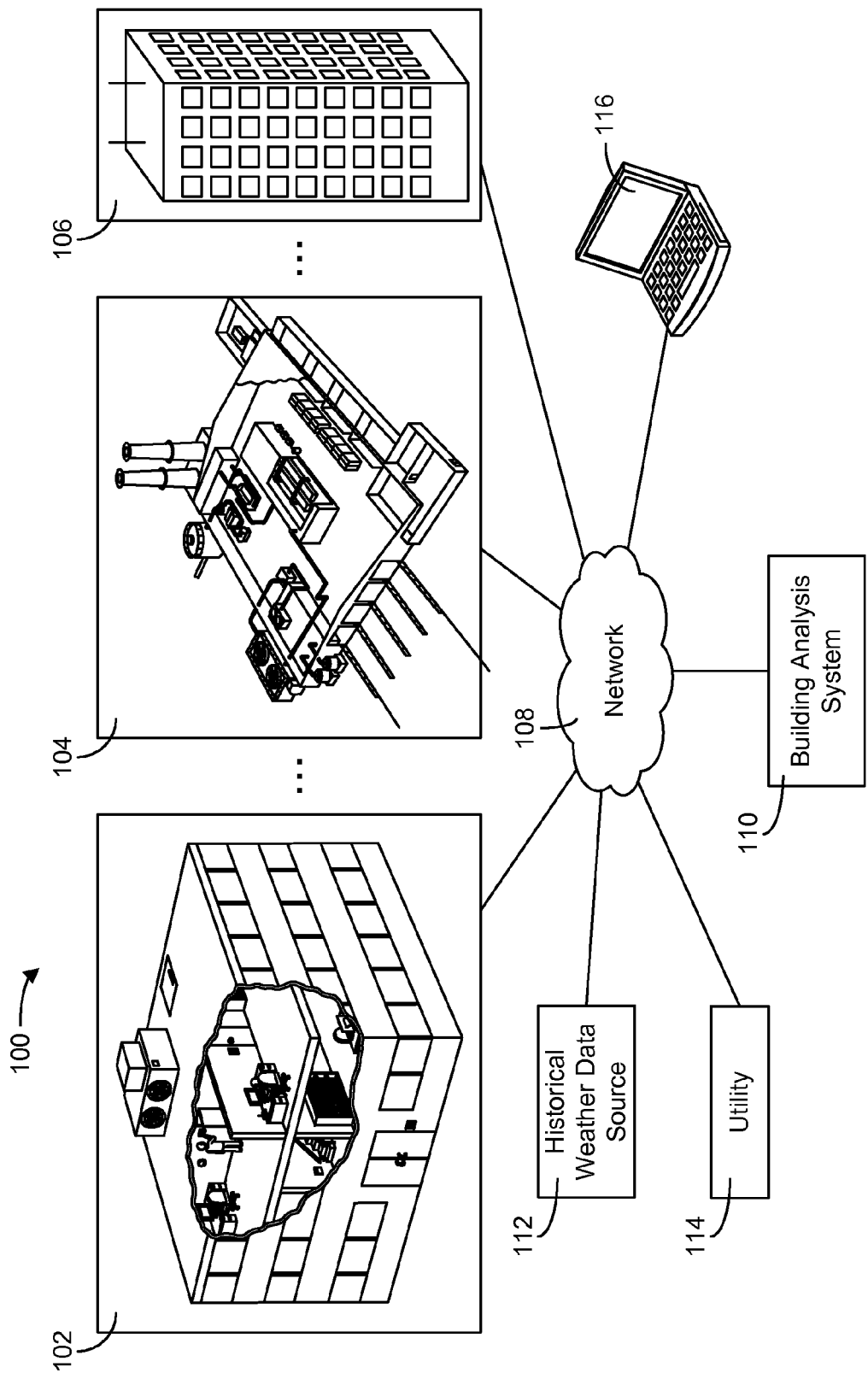
FIG. 1 is a drawing of a building data acquisition system including buildings, a network, a historical weather data source, a utility, and a building analysis system, according to an exemplary embodiment

Before turning to the FIGURES, it should be understood that the disclosure is not limited to the details or methodology set forth in the description or illustrated in the FIGURES. It should also be understood that the terminology is for the purpose of description only and should not be regarded as limiting.

Referring generally to the FIGURES, systems and methods for determining an appropriate parameter order for a building energy use model are shown, according to various exemplary embodiments. Building energy use models may take a variety of forms including parametric models (e.g., linear regression, non-linear regression, etc.), non-parametric models (e.g., neural networks, kernel estimation, Bayesian, etc.) or something in between (e.g., Gaussian process models, etc.). A building energy use model may describe the energy usage of a building or building site in terms of one or more independent variables (e.g., weather data, occupancy data, etc.) and one or more model parameters.

Building energy use models may be classified based on the parameter order of the model (e.g., number of parameters, number of parameter vectors, etc.). For example, the energy usage of some buildings or building sites may be described using a one-parameter model in which energy use is restricted to a baseline energy consumption (e.g., ignoring independent variables such as outside air temperature, building occupancy, etc.). Other buildings or building sites may warrant a two-parameter model (e.g., a baseline energy consumption and either a heating profile or a cooling profile), a three-parameter model (e.g., a baseline energy consumption and either a heating profile or a cooling profile having a break even temperature or balance point), a four-parameter model (e.g., a baseline energy consumption and both a heating profile and a cooling profile, where both the heating profile and the cooling profile have a shared balance point), a five-parameter model (e.g., a baseline energy consumption and both a heating profile and a cooling profile, where the heating profile and the cooling profile have different balance points), or an energy use model having a higher parameter order.

The appropriate parameter order for a building energy use model may depend on the physical characteristics of the building or building site. For example, a two-parameter model may be distinguished from a three-parameter model by determining whether the energy use model has a break even temperature or balance point. The break even temperature or balance point may be a threshold outside air temperature at which heating or cooling is no longer required to maintain the temperature of the air in the building within an acceptable temperature range.

For buildings located in temperate climates (e.g., climates in which the outside air temperature is often within or near the acceptable temperature range), the break even temperature may be determined by inspecting energy use data associated with the building. For example, by examining building energy usage as a function of outside air temperature, the break even temperature can be identified as the temperature at which energy usage no longer depends on the outside air temperature. A three-parameter model may have the appropriate parameter order to accurately model buildings or building sites having a break even temperature.

For buildings located in extreme climates (e.g., climates in which the outside air temperature is consistently hot or consistently cold), it may be difficult to accurately determine the break even temperature because heating or cooling may be required at all times or nearly all times to maintain the temperature of the air in the building within the acceptable temperature range. A two-parameter model may have the appropriate parameter order to accurately model buildings or building sites for which a break even temperature is not applicable or cannot be readily determined from building performance data (e.g., energy use data, weather data, occupancy data, etc.).

The systems and methods described herein may be used to determine an appropriate parameter order for a building energy use model. In some embodiments, the described systems and methods may be used to determine whether the energy usage of a building or building site is best modeled using a two-parameter model or a three-parameter model. Performance data for the building or building site may be used to construct both a two-parameter regression model (e.g., without a balance point parameter) and a three-parameter regression model (e.g., with a balance point parameter) describing the energy use of the building. In some embodiments, the balance point parameter may be set to a fixed value in the two-parameter regression model such that the total number of unknown parameters in the two-parameter regression model is less than the total number of unknown parameters in the three-parameter regression model. Reducing the number of unknown parameters in a model can help improve the accuracy of the model. Determining and using an appropriate number of parameters in the model can also help improve the accuracy of the model.

Hypothesis testing may be used to determine whether the addition of the variable balance point parameter in the three-parameter model results in a statistically significant improvement to the fit of the energy use model to the performance data. If the fit of three-parameter model is significantly better than the fit of the two-parameter model, it may be determined that a three-parameter model has the appropriate parameter order for the building or building site. A test statistic based on the respective errors of regression of the two-parameter model and the three-parameter model may be used to quantify whether the fit of the three-parameter model is significantly better.

Referring now to FIG. 1, an illustration of a building data acquisition system 100 is shown, according to an exemplary embodiment. Building data acquisition system 100 may be configured to collect, store, and/or analyze performance data related to a building's energy use. The performance data for the building may be used to model the building's energy usage, predict related parameters in the energy use model, and/or determine an appropriate parameter order for the energy use model.

Building data acquisition system 100 is shown to include buildings 102-106. Buildings 102-106 may include any number of buildings (e.g., a first through a nth building) and any type of buildings (e.g., commercial buildings, residential buildings, industrial buildings, etc.). For example, building 102 may be an office building, building 104 may be a manufacturing facility, and building 106 may be a hospitality facility, such as a hotel. Other exemplary buildings in buildings 102-106 may include, but are not limited to, data centers, schools, shipping facilities, and government buildings. Buildings 102-106 may include any combination of building types.

Buildings 102-106 may be located within the same geographic regions as one another or across different geographic regions. For example, building 102 and building 104 may be located in the same city, while building 106 may be located in a different city. Different levels of granularity may be used to distinguish buildings 102-106 as being located in the same geographic region. For example, geographic regions may be divided by country, state, city, metropolitan area, time zone, zip code, area code, latitude, longitude, growing zone, combinations thereof, or using any other geographic classification system. In some embodiments, a building's geographic location may be used as a proxy for its climatic zone. For example, data regarding a building's location in Hawaii may be used to determine that the building is located in a tropical climate.

In some embodiments, each of buildings 102-106 may be part of a building site (e.g., the same building site, separate building sites, etc.). A building site may include one or more of buildings 102-106 and typically includes buildings that are located proximate to each other and/or interconnected. A single HVAC system, water system, and/or electric grid may service multiple buildings that are part of the same building site. An energy use model may be developed for individual buildings, for a building site, or for both individual buildings and a building site.

Buildings 102-106 may be equipped with sensors and other monitoring devices configured to measure performance data related to the building's energy consumption. For example, buildings 102-106 may have devices (e.g., computing devices, power meters, etc.) configured to measure the water consumption, energy consumption, and energy demand of buildings 102-106. Other forms of performance data may include a measured temperature in one or more zones of a building, dimensions of the building (e.g., square footage, etc.), and/or any other value that relates to the building's energy usage profile. In some embodiments, performance data includes data used in a building automation system. For example, performance data may include control parameters (e.g., set points, tuning parameters, threshold values, etc.) used to regulate the temperature in the building and/or timing data used to automatically turn on or off lighting within the building (e.g., at night, when the building is unoccupied, according to a set schedule, etc.).

In some embodiments, readily available data may be used to determine and model a building's energy consumption. For example, billing data received from a utility 114 may be used to determine a building's energy consumption and the financial costs associated with the energy consumption. Such an approach may simplify and reduce the cost of performing the energy analysis over approaches that rely heavily on sensor data from a building.

In some embodiments, performance data includes weather data for a region in which buildings 102-106 are located. The weather data may be generated by weather-sensing equipment at buildings 102-106. For example, buildings 102-106 may be equipped with temperature sensors that measure the outside air temperature. In other embodiments, buildings 102-106 may be configured to receive weather data from an external weather data source.

In some embodiments, performance data includes weather data for a typical meteorological year (TMY) received from historical weather data source 112 (e.g., a computer system of the National Oceanic and Atmospheric Administration or similar data source). In the United States of America, the first set of TMY data was collected between 1948-1980 from various locations throughout the country. A second set of TMY data (TMY2), which also includes data regarding precipitable moisture, was collected between 1961-1990. In addition, a third set of TMY data (TMY3), was collected from many more locations than TMY2 data over the span of 1976-1995. Regardless of the version used, TMY data may be used to compare current conditions to normal or predicted conditions, in some embodiments. In further embodiments, TMY data may be used to predict future conditions of a building (e.g., by using the historical data to predict typical future weather conditions) or future energy consumptions by a building. For example, TMY data may be used to predict an average outdoor temperature change for a building during the upcoming month of March. TMY data may be stored by the building automation systems of buildings 102-106 or building analysis system 110 and used to model the heating and cooling needs of buildings 102-106. As used herein, "TMY data" may refer to any version or set of TMY data (e.g., TMY2 data, TMY3 data, etc.).

Performance data may be collected for individual buildings 102-106 or for a building site. For example, energy usage data (e.g., received from utility 114 or otherwise) for multiple buildings may be combined into a total energy usage for a building site. Buildings that are part of the same building site may share the same outside air temperature, outside air enthalpy, or other weather-related predictor variables (e.g., cooling degree days, heating degree days, cooling energy days, heating energy days, etc.).

Still referring to FIG. 1, building data acquisition system 100 is shown to include a network 108. Network 108 may be any form of computer network that relays information between buildings 102-106 and a building analysis system 110. For example, network 108 may include the Internet and/or other types of data networks, such as a local area network (LAN), a wide area network (WAN), a cellular network, satellite network, or other types of data networks. Network 108 may also include any number of computing devices (e.g., computer, servers, routers, network switches, etc.) that are configured to receive and/or transmit data within network 108. Network 108 may further include any number of hardwired and/or wireless connections. For example, building 102 may communicate wirelessly (e.g., via WiFi, ZigBee, cellular, radio, etc.) with a transceiver that is hardwired (e.g., via a fiber optic cable, a CAT5 cable, etc.) to other computing devices in network 108.

Still referring to FIG. 1, building data acquisition system 100 is shown to include a building analysis system 110. Building analysis system 110 may include one or more electronic devices connected to network 108. In various embodiments, building analysis system 110 may be a computer server (e.g., an FTP server, file sharing server, web server, etc.) or a combination of servers (e.g., a data center, a cloud computing platform, etc.). Building analysis system 110 may include a processing circuit configured to perform the functions and processes described herein.

Building analysis system 110 may be configured to obtain performance data for buildings 102-106 (e.g., either directly from buildings 102-106 or from another computing device connected to network 108). The performance data may include a plurality of data points. Each of the data points may include a value for a weather-related predictor variable (e.g., outside air temperature or enthalpy, cooling degree days, heating degree days, cooling energy days, heating energy days, etc.) and an associated energy consumption value for a building or building site. The performance data may be received by building analysis system 110 periodically, in response to a request for data from building analysis system 110, in response to receiving a request from a client device 116 (e.g., a user operating client device 116 may request that the building data be sent by the computing device), or at any other time.

In some embodiments, building analysis system 110 is configured to model the energy usage of buildings 102-106 using the performance data. In other embodiments, building analysis system receives an energy use model for buildings 102-106 from an external source (e.g., within building data acquisition system 100 or otherwise). The building energy use model generated or received by building analysis system 110 may be a parametric model or a non-parametric model. In some embodiments, building analysis system 110 may perform LEAN energy analysis using readily available data (e.g., utility billing data, weather data, etc.) to model the energy usage profiles of buildings 102-106 and/or predict an energy cost for buildings 102-106. Building analysis system 110 may generate and provide various reports to client 116, which may be located within one of buildings 102-106 or at another location.

In some embodiments, building analysis system 110 may be implemented at one or more of buildings 102-106. For example, building analysis system 110 may be integrated as part of a building automation system (BAS) for buildings 102-106 (e.g., as part of a centralized BAS or in a distributed implementation). In a distributed implementation, performance data may be shared among the distributed components of building analysis system 110 via network 108. For example, computing devices at buildings 102-106 may be configured to collaboratively share performance data regarding their respective building's energy consumption and demand. The sharing of performance data among the buildings' respective computing devices may be coordinated by one or more of the devices, or by a remote coordination service (e.g., a supervisory controller or remote server connected to network 108). Building analysis system 110 is described in greater detail with reference to FIG. 3.

Figure 2:
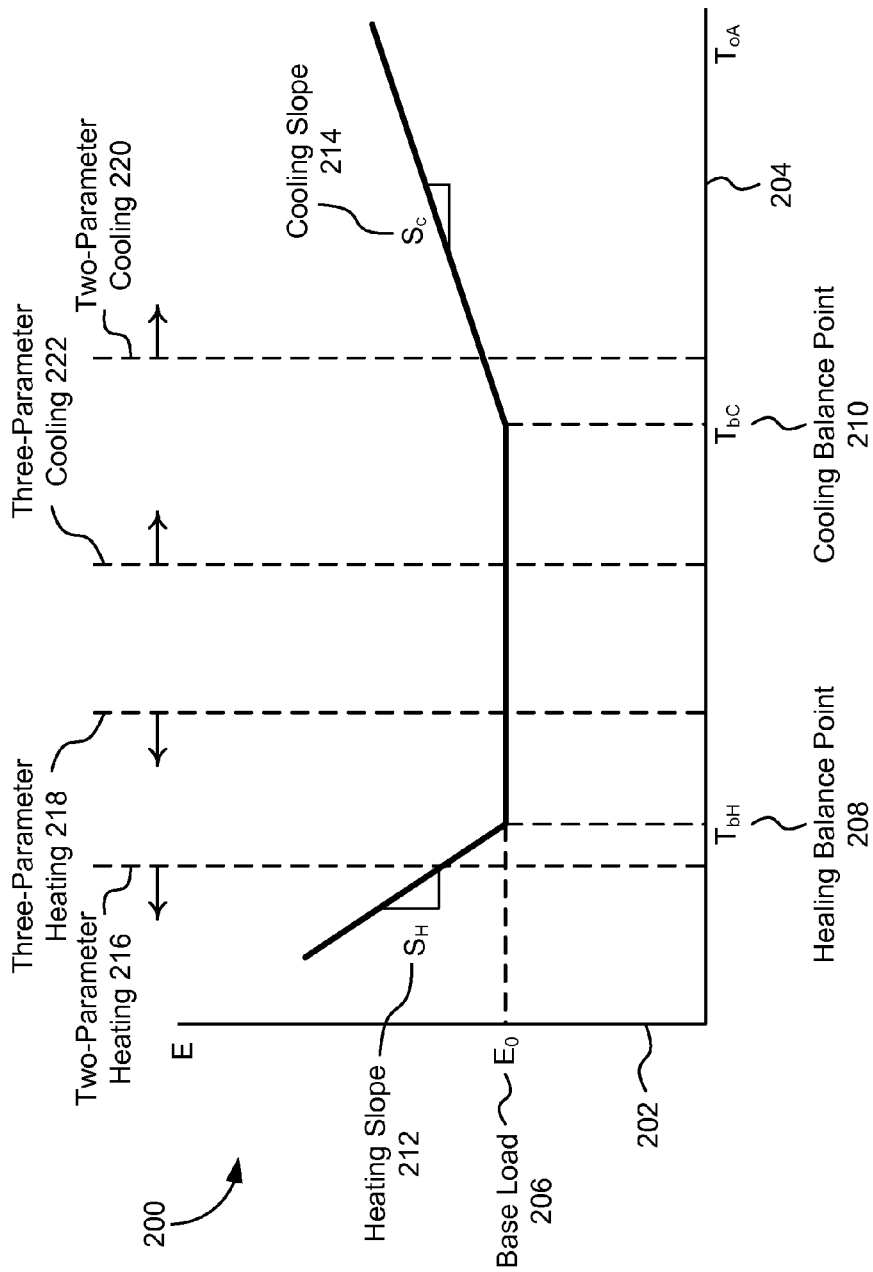
FIG. 2 is an illustration of an energy use profile for a building or building site, according to an exemplary embodiment.

Referring now to FIG. 2, an energy use profile 200 for a building or building site is shown, according to an exemplary embodiment. In general, a number of different factors may affect the energy use of a building. For example, weather-related variables such as the air temperature outside the building may affect the amount of energy required to heat or cool the building to a set point temperature. In some embodiments, the building's energy use profile when cooling the building may differ from the building's energy use profile when heating the building. In some embodiments, the energy use model for the building includes parameters relating to both heating and cooling the building (e.g., for a four-parameter model or a five-parameter model). In other embodiments, the energy use model for the building includes parameters relating to either heating or cooling the building, but not both (e.g., for a two-parameter model or a three parameter model).

Energy use profile 200 is shown as an x-y plot with building energy use E plotted along a first axis 202 and outdoor air temperature $T_{OA}$ plotted along a second axis 204. In various embodiments, the building's energy use E may be an energy consumption (e.g., measured in kWh) or an energy cost associated with the building's energy consumption. Energy consumption and/or energy cost information may be obtained, for example, from billing data provided by utility 114. In some embodiments, the outdoor air temperature $T_{OA}$ may be measured using sensors located at or near the building over a particular time period. Energy use profile 200 is shown to include a base energy load $E_0$ 206, a heating balance point $T_{bH}$ 208, a cooling balance point $T_{bC}$ 210, a heating slope $S_H$ 212, and a cooling slope $S_C$ 214.

Base energy load $E_0$ 206 may be a baseline or fixed energy usage that does not depend on the outdoor air temperature $T_{OA}$. For example, base energy load $E_0$ 206 may be a function of the energy consumption of the building's lighting, computer systems, security systems, and other such electronic devices in the building. Since the energy consumption of these devices does not change as a function of the outdoor air temperature $T_{OA}$, base energy load $E_0$ 206 may be used to represent the portion of the building's energy consumption that is not a function of the outdoor air temperature $T_{OA}$.

Heating slope $S_H$ 212 may correspond to the change in energy consumption or energy costs that results when the outdoor air temperature $T_{OA}$ drops below a heating balance point $T_{bH}$ 208 (e.g., a breakeven temperature). For example, assume that heating balance point $T_{bH}$ 208 for a building is 55° F. When the outdoor air temperature $T_{OA}$ is at or above 55° F., only an energy expenditure equal to base load $E_0$ 206 may be needed to maintain the internal temperature of the building. However, additional energy may be needed if the outdoor air temperature $T_{OA}$ drops below 55° F. (e.g., to provide mechanical heating to the interior of the building). As the outdoor air temperature $T_{OA}$ decreases, the amount of energy needed to heat the building increases at a rate corresponding to heating slope $S_H$ 212.

Cooling slope $S_C$ 214 may correspond to the change in energy consumption or energy costs that result when the outdoor air temperature $T_{OA}$ rises above a cooling balance point $T_{bC}$ 210 (e.g., a breakeven temperature). For example, assume that cooling balance point $T_{bC}$ 210 for a building is 67° F. When the outdoor air temperature $T_{OA}$ is at or below 67° F., only an energy expenditure equal to base load $E_0$ 206 may be needed to maintain the internal temperature of the building. However, additional energy may be needed if the outdoor air temperature $T_{OA}$ rises above 67° F. (e.g., to provide mechanical cooling to the interior of the building). As the outdoor air temperature $T_{OA}$ increases, the amount of energy needed to cool the building increases at a rate corresponding to cooling slope $S_C$ 214.

Still referring to FIG. 2, energy use profile 200 may be associated with a building or building site having a five-parameter energy use model, where base energy usage $E_0$ 206, heating balance point $T_{bH}$ 208, cooling balance point $T_{bC}$ 210, heating slope $S_H$ 212, and cooling slope $S_C$ 214 correspond to the five parameters of the five-parameter model.

In some embodiments, not all five parameters may be necessary or appropriate to model a building's energy use. For example, if the building is located in a cold climate such that the outdoor air temperature $T_{OA}$ is never higher than heating balance point $T_{bH}$ 208, a two-parameter heating model may be appropriate. Parameters in the two-parameter heating model may include base energy load $E_0$ 206 and heating slope $S_H$ 212. An energy profile associated with a two-parameter heating model may be the portion of energy use profile 200 to the left of two-parameter heating line 216.

If the building is located in a hot climate such that the outdoor air temperature $T_{OA}$ is never lower than cooling balance point $T_{bC}$ 210, a two-parameter cooling model may be appropriate. Parameters in the two-parameter cooling model may include base energy load $E_0$ 206 and cooling slope $S_C$ 214. An energy profile associated with a two-parameter cooling model may be the portion of energy use profile 200 to the right of two-parameter cooling line 220.

If the building is located in a moderately cool climate such that the outdoor air temperature $T_{OA}$ is sometimes below heating balance point $T_{bH}$ 208 (e.g., $T_{OA}<T_{bH}$) and sometimes between heating balance point $T_{bH}$ 208 and cooling balance point $T_{bC}$ 210 (e.g., $T_{bH}<T_{OA}<T_{bC}$), a three-parameter heating model may be appropriate. Parameters in the three-parameter heating model may include base energy load $E_0$ 206, heating balance point $T_{bH}$ 208, and heating slope $S_H$ 212. An energy profile associated with a three-parameter heating model may be the portion of energy use profile 200 to the left of three-parameter heating line 218.

If the building is located in a moderately warm climate such that the outdoor air temperature $T_{OA}$ is sometimes above cooling balance point $T_{bC}$ 210 (e.g., $T_{OA}>T_{bC}$) and sometimes between heating balance point $T_{bH}$ 208 and cooling balance point $T_{bC}$ 210 (e.g., $T_{bH}<T_{OA}<T_{bC}$), a three-parameter cooling model may be appropriate. Parameters in the three-parameter cooling model may include base energy load $E_0$ 206, cooling balance point $T_{bC}$ 210, and cooling slope $S_C$ 214. An energy profile associated with a three-parameter cooling model may be the portion of energy use profile 200 to the right of three-parameter cooling line 222.

If the building transitions between supplying heating and cooling at a single balance point (e.g., the building's heating balance point $T_{bH}$ and cooling balance point $T_{bC}$ are equal), a four parameter model may be appropriate. The parameters in the four-parameter model may include base energy load $E_0$ 206, heating slope $S_H$ 212, cooling slope $S_C$ 214, and a single balance point which is both heating balance point $T_{bH}$ 208 and cooling balance point $T_{bC}$ 210.

Figure 3:
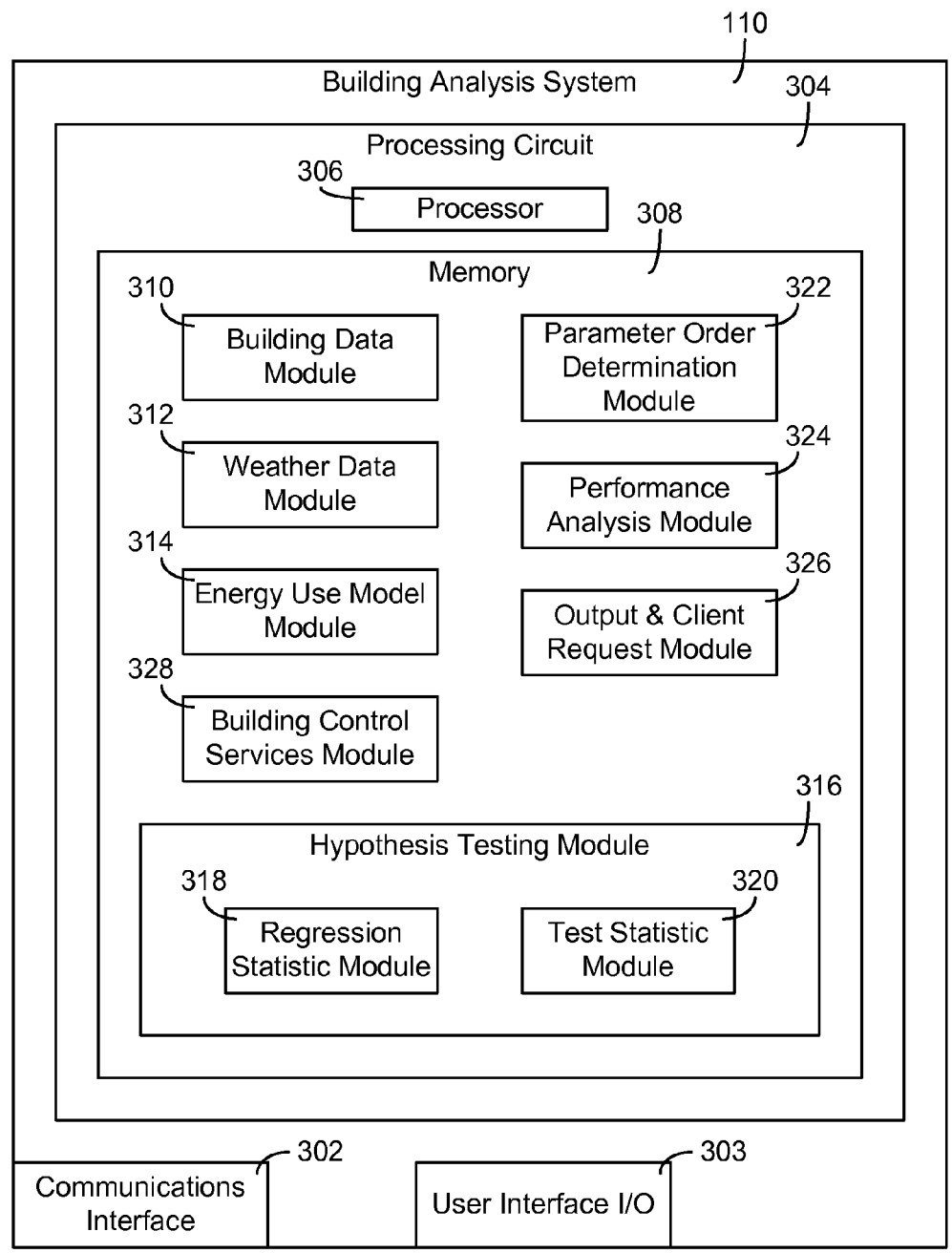
FIG. 3 is a block diagram illustrating the building analysis system of FIG. 1 in greater detail, according to an exemplary embodiment.

Referring now to FIG. 3, a block diagram illustrating a building analysis system 110 in greater detail is shown, according to an exemplary embodiment. Building analysis system 110 may be configured to obtain energy-related performance data for a building or building site. Building analysis system 110 may test a fit of the performance data to multiple energy use models for the building or building site (e.g., a two-parameter model and a three-parameter model). By comparing the fit of the performance data to multiple energy use models having different numbers of parameters, building analysis system 110 may determine an appropriate parameter order for the energy use model.

Building analysis system 110 is shown to include a communications interface 302, a user interface I/O 303, and a processing circuit 304. Communications interface 302 may include wired or wireless interfaces (e.g., jacks, antennas, transmitters, receivers, transceivers, wire terminals, etc.) for conducting electronic data communications with the various components of building data acquisition system 100 or other external devices or data sources. Data communications may be conducted via a direct connection (e.g., a wired connection, an ad-hoc wireless connection, etc.) or a network connection (e.g., an Internet connection, a LAN, WAN, or WLAN connection, etc.). For example, communications interface 302 can include an Ethernet card and port for sending and receiving data via an Ethernet-based communications link or network. In various embodiments, communications interface 302 can include a WiFi transceiver, a cellular transceiver, or a mobile phone transceiver for communicating via a wireless communications network.

Communications interface 302 may receive energy-related performance data for a building or building site. Performance data may include, for example, energy consumption data, energy cost data, energy demand data, outside air temperature data, historical weather or meteorological data, pricing or billing data (e.g., from an energy provider), predicted energy usage data, or other energy-related data associated with a building or building site. In some embodiments, the performance data includes a plurality of data points including at least one weather-related predictor variable (e.g., outside air temperature/enthalpy, cooling degree days, heating degree days, cooling energy days, heating energy days, etc.).

In some embodiments, communications interface 302 receives an energy use model for the building or building site. In other embodiments, building analysis system 110 constructs the energy use model using the energy-related performance data. In some embodiments, multiple energy use models may be received or constructed. The multiple energy use models may have various numbers of parameters. By comparing the fit of the performance data to the various energy use models, building analysis system 110 may determine an appropriate model parameter order for the building or building site.

Still referring to FIG. 3, building analysis system 110 is shown to include a user interface I/O 303. User interface I/O 303 may include one or more user interface input and/or output devices for facilitating user interaction with building analysis system 110. User interface I/O 303 may include, for example, a local display (e.g., a LCD panel, an electronic display screen, one or more indicator lights, etc.), a keyboard, a mouse, a printer, a microphone, a speaker, a touch-sensitive panel, a camera, a scanner, one or more user-operable buttons, dials, sliders, switches, or any other type of user interface device.

User interface I/O 303 may be used to receive input from a user (e.g., physical input, verbal input, etc.) and to provide output to a user in a user-comprehensible format (e.g., text, numbers, words, sounds, status indicators, visual displays, printouts, etc.). For example, a user may interact with user interface I/O 303 to submit a request for information regarding the parameter order of a particular building energy use model. Building analysis system 110 may process the user request and provide the user with an output (e.g., a visual display, a textual/graphical output, etc.) indicating the parameter order of the particular building energy use model. As another example, a user may interact with user interface I/O to request a performance analysis report for a particular building or building system. Building analysis system 110 may process the request and provide the user with an output (e.g., a visual display, a textual/graphical report, etc.) analyzing the performance of the particular building or building system.

In various embodiments, user input may be received locally (e.g., via user interface I/O 303) or remotely (e.g., via a LAN connection, a WAN connection, a network connection, an Internet connection, etc.) from a remote user interface client (e.g., a remote computer, a remote user device, etc.). User output may also be provided locally to a user interacting with building analysis system 110 via user interface I/O 303 or remotely to a user interacting with building analysis system 110 via a remote user interface client (e.g., a remote computer, over a network, etc.). In some embodiments, user input and user output may be sent and received via communications interface 302, user interface I/O 303, and/or a combination of both communications interface 302 and user interface I/O 303.

Still referring to FIG. 3, building analysis system 110 is shown to include a processing circuit 304. In some embodiments, processing circuit 304 is a component of building analysis system 110. In other embodiments, processing circuit 304 is a component of any other computing device or system configured to analyze energy-related characteristics and/or statistics of a building. In some embodiments, the various components of processing circuit 304 may be distributed across multiple computing devices or systems.

Processing circuit 304 is shown to include a processor 306 and memory 308. Processor 306 can be implemented as one or more microprocessors (e.g., CPUs, GPUs, etc.), an application specific integrated circuit (ASIC), one or more field programmable gate arrays (FPGAs), a circuit containing one or more processing components, a group of distributed processing components (e.g., processing components in communication via a data network or bus), circuitry for supporting a microprocessor, or other hardware configured for processing data. Processor 306 may be configured to execute computer code stored in memory 308 to complete and facilitate the activities described herein.

Memory 308 may include one or more devices (e.g., RAM, ROM, solid state memory, hard disk storage, etc.) for storing data and/or computer code for completing or facilitating the various processes, layers, and modules of the present disclosure. Memory 308 may include volatile memory or non-volatile memory. Memory 308 may include database components, object code components, script components, or any other type of information structure for supporting the various activities and information structures of the present disclosure. According to an exemplary embodiment, memory 308 is communicably connected to processor 306 via processing circuit 304 and includes computer code for executing (e.g., by processing circuit 304 and/or processor 306) one or more processes described herein. In brief overview, memory 308 is shown to include a building data module 310, a weather data module 312, an energy use model module 314, a hypothesis testing module 316, a regression statistic module 318, a test statistic module 320, a parameter order determination module 322, and performance analysis module 324, an output and client request module 326, and a building control services module 328.

Still referring to FIG. 3, memory 308 is shown to include a building data module 310. Building data module 310 may obtain and/or store building data related to buildings 102-106. In some embodiments, building data includes data relating to the physical characteristics of a building. For example, building data may include data regarding a building's geographic location (e.g., street address, city, coordinates, etc.), dimensions (e.g., floor space, stories, etc.), classification (e.g., office space, hospital, school, etc.), building materials, or any other physical characteristic which may be used to describe a building.

In some embodiments, building data includes energy-related performance data for buildings 102-106. Energy-related performance data may include, for example energy consumption data (e.g., current energy usage, historical energy usage, predicted energy usage, etc.), measured temperatures or other sensory data obtained by one or more sensory devices of buildings 102-106, and/or control parameters (e.g., set points, tuning parameters, threshold values, etc.) used to regulate the temperature or other variables within buildings 102-106. In some embodiments, building data includes baseline energy consumption data (e.g., a base load $E_0$), balance point data (e.g., a heating balance point $T_{bH}$, a cooling balance point $T_{bC}$, a single balance point which is both the heating balance point $T_{bH}$ and the cooling balance point $T_{bC}$, etc.), heating or cooling slope data (e.g., a heating slope $S_H$, a cooling slope $S_C$, etc.), or other data describing the parameters used in an energy use model for a particular building or building site.

In some embodiments, building data may include billing data from one or more utilities (e.g., utility 114) that supply buildings 102-106 with a consumable resource. For example, building data may include billing data from a utility that provides the building with electrical power. In another example, building data may include billing data from a utility that supplies water to the building.

In some embodiments, building data module 310 uses the building data to calculate one or more normalized metrics. For example, building data module 310 may normalize the building's energy consumption using the building's internal volume or area. The normalized energy consumption may be expressed as an energy consumption per unit area $$\left(e.g., \frac{kWh}{ft^2}\right)$$

and/or an energy consumption per unit volume $$\left(e.g., \frac{kWh}{ft^3}\right).$$

The normalized metrics may be used by building analysis system 110 to compare the energy consumption of buildings having different sizes, areas, and/or volumes.

Still referring to FIG. 3, memory 308 is shown to include a weather data module 312. Weather data module 312 may obtain and store weather data for one or more geographic locations. For example, weather data may include historical, current, or predicted data regarding a location's temperature (e.g., outside air temperature), humidity, atmospheric pressure, wind speed, precipitable water, or other weather-related data. In some embodiments, weather data may be gathered via sensors located at or near buildings 102-106. In some embodiments, weather data includes TMY data (e.g., TMY2, data, TMY3 data, etc.). Weather data may include weather data from any number of different time periods having any degree of granularity. For example, weather data may identify weather conditions on a monthly, weekly, daily, or hourly level.

In some embodiments, weather data includes a plurality of data points including a value for at least one weather-related predictor variable. The weather-related predictor variable may be any variable that depends on a weather-related value (e.g., outside air temperature $T_{OA}$, enthalpy, humidity, pressure, wind speed, precipitation level, etc.). In some embodiments, the weather-related predictor variable may be calculated based on one or more weather-related values. For example, the weather-related predictor variable may be a cooling degree day (CDD) value, a heating degree day (HDD) value, a cooling energy day (CED) value, or a heating energy day (HED) value.

A CDD or HDD value may represent the amount of heating or cooling needed by the building over a period of time. In some embodiments, the CDD and HDD values for a building may be calculated by integrating the difference between the outside air temperature $T_{OA}$ of the building and a given temperature over a period of time. The given temperature may be a cooling balance point for the building (e.g., cooling balance point $T_{bC}$ 210) to determine a CDD value, or heating balance point for the building (e.g., heating balance point $T_{bH}$ 208) to determine a HDD value. For example, CDD and HDD values for the building over the course of a month may be calculated as follows:

$$CDD = \int^{month} Max\{0,(T_{OA}-T_{bC})\}dt$$

$$HDD = \int^{month} Max\{0,(T_{bH}-T_{OA})\}dt$$

In other embodiments, a set reference temperature may be used to calculate a building's CDD or HDD value instead of the building's actual balance point. For example, a reference temperature of 65° F. may be used as a fixed value to compare with the building's outdoor air temperature. CED and HED values may be calculated in a similar manner using outside air enthalpy rather than outside air temperature $T_{OA}$. Weather data module 312 may calculate values for one or more weather-related predictor variables (e.g., CDD, HDD, CED, HED, etc.) using observed weather data values (e.g., outside air temperature $T_{OA}$, outside air enthalpy, etc.).

Still referring to FIG. 3, memory 308 is shown to include an energy use model module 314. Energy use model module 314 may store one or more energy use models for a building or building site. The one or more energy use models may be of any form. For example, energy use model module 314 may store parametric models (e.g., linear regression models, non-linear regression models, etc.), non-parametric models (neural networks, kernel estimation, hierarchical Bayesian, etc.), or something in between (e.g., Gaussian process models). In some embodiments, energy use model module 314 receives one or more energy use models via communications interface 302. In other embodiments, energy use model module 314 generates one or more energy use models using the building data stored in building data module 310 and/or the weather data stored in weather data module 312.

In various embodiments, energy use model module 314 generates a two-parameter energy use model, a three parameter energy use model, or both a two-parameter and a three-parameter energy use model. For buildings or building sites that have either a heating profile or a cooling profile (but not both), hypothesis testing the two-parameter model and/or the three parameter model may be sufficient to determine an appropriate parameter order (e.g., two or three) for the building's energy use model. In other embodiments, energy use model module 314 generates one or more energy use models having a higher or lower parameter order (e.g., a single parameter model, a four-parameter model, a five-parameter model, etc.). For buildings or building sites having both a heating profile and a cooling profile, the higher order models may be useful in determining an appropriate parameter order.

In some embodiments, energy use model module 314 models the energy use of a building using linear regression. A linear regression model for a building may be represented by the following equation:

$$Y = X\beta + e,$$

where $Y \in \Re^{n \times 1}$ is the building's energy consumption, $X \in \Re^{n \times p}$ is a predictor variable matrix, $\beta \in \Re^{p \times 1}$ is a vector of unknown regression coefficients, and e is the model error such that $e \sim N(0, t_i \sigma^2)$. The predictor variable matrix X may have a size of n×p where p is the total number of predictor variables (e.g., including the number of days per period $t = [t_1 \ldots t_n]^T$) and n is the total number of observations.

The predictor variable matrix X may include a weather-related predictor variable (e.g., outside air temperature $T_{OA}$, enthalpy, cooling degree days, heating degree days, heating energy days, cooling energy days, etc.). The weather-related predictor variable may be a function of a balance point parameter (e.g., $T_{bH}$, $T_{bC}$, etc.) used to calculate heating degree days or cooling degree days. The balance point parameter may indirectly affect the energy consumption predicted by the energy use model by affecting the value of the weather-related predictor variable. In some embodiments, energy use model module 314 uses only one weather-related predictor variable. Non-weather-related predictor variables may include, for example, water consumption, building occupancy, days off, the number of days per period t, and/or any other variable which may affect the building's energy consumption.

Vector β may include one or more regression coefficients (e.g., $\beta_0, \beta_1, \ldots \beta_p$) of the energy use model. In some embodiments, each regression coefficient corresponds to a parameter of the energy use model. For example, a one-parameter model may have a single regression coefficient $\beta_0$ corresponding to a base energy load $E_0$ model parameter. A two-parameter model may have two regression coefficients $\beta_0$ and $\beta_1$ corresponding to a base energy load $E_0$ model parameter and either a heating slope $S_H$ model parameter (e.g., for a two-parameter heating model) or cooling slope $S_C$ model parameter (e.g., for a two-parameter cooling model). A three-parameter model may have two regression coefficients (e.g., $\beta_0$ and $\beta_1$) as well as a balance point parameter corresponding to either heating a balance point $T_{bH}$ (e.g., for a three-parameter heating model) or cooling balance point $T_{bC}$ (e.g., for a three-parameter cooling model).

The order of the energy use model may be defined by the number of parameters θ in the energy use model. Model parameters θ may include both explicit model parameters (e.g., regression coefficients $\beta_0, \beta_1, \ldots \beta_p$) and non-explicit model parameters (e.g., balance point parameters $T_{bH}$ and $T_{bC}$). Non-explicit model parameters may include balance point parameters and other parameters (i.e., other than regression coefficients of the energy use model) which contribute to the energy use predicted by the energy use model by affecting the value of one or more of the predictor variables in predictor variable matrix X. For example, the value of a balance point parameter (e.g., $T_{bH}$ or $T_{bC}$) may affect the value of a weather-related predictor variable (e.g., CDD, HDD, etc.) in predictor variable matrix X.

In some embodiments, modeling the energy use E of a building using linear regression includes estimating the values of the regression model coefficients in vector β. Energy use model module 314 may use any of a variety of different estimation techniques to estimate the values of the regression model coefficients in vector β. In some embodiments, energy use model module 314 uses a partial least squares regression (PLSR) method. In other embodiments, energy use model module 314 may use other methods, such as ridge regression (RR), principal component regression (PCR), weighted least squares regression (WLSR), or ordinary least squares regression (OLSR).

Generally, a least squares estimation problem can be stated as follows: given a linear model $$Y = X\beta + e, e \sim N(0, t_i \sigma^2),$$

find the vector $\hat{\beta}$ that minimizes the sum of squared error RSS, where $$RSS = \sum_{i=1}^{n} \frac{\hat{e}_i^2}{t_i} \text{ and } \hat{e} = \|Y - X\hat{\beta}\|.$$

In the above equations, Y is a vector of size n×1 that contains the individual n observations of the dependent variable (e.g., energy use E), X is a matrix of size n×p where p is the total number of predictor variables (e.g., including the number of days per period $t=[t_1 \ldots t_n]^T$), and e is a normally distributed random vector with zero mean and uncorrelated elements. The optimal value of $\hat{\beta}$ based on a least squares estimation has the solution $$\hat{\beta} = (X^T X)^{-1} X^T Y.$$

Energy use model module 314 may solve the least squares estimation problem to estimate values for the regression model coefficients in vector $\beta$.

In some embodiments, energy use model module 314 estimates the model parameters $\theta$ for a two-parameter energy use model and/or a three-parameter energy use model. In a three-parameter energy use model, the model parameters $\theta$ may include one more unknown parameter (e.g., a heating balance point $T_{bH}$ or a cooling balance point $T_{bC}$) than in a two-parameter model. For example, in a two-parameter model, the model parameters $\theta$ may include only the regression model coefficients $\beta$ (e.g., $\theta=\beta$). In a three-parameter model, the model parameters $\theta$ may include both the regression model coefficients $\beta$ and either a heating balance point $T_{bH}$ or a cooling balance point $T_{bC}$ (e.g., $\theta=[\beta\ T_b]^T$ where $T_b$ is either $T_{bH}$ or $T_{bC}$. When estimating the model parameters $\theta$, for the two-parameter model, energy use model module 314 may set the model parameter corresponding to the heating balance point $T_{bH}$ or the cooling balance point $T_{bC}$ to a fixed value. The fixed value may be a minimum of the outside air temperature or the outside air enthalpy (e.g., for the cooling balance point $T_{bC}$) or a maximum of the outside air temperature or the outside air enthalpy (e.g., for the heating balance point $T_{bH}$).

In some embodiments, energy use model module 314 uses outside air temperature and energy consumption data to estimate the balance points (e.g., $\hat{T}_{bC}$ and/or $\hat{T}_{bH}$). For example, energy use model module 314 may analyze the energy consumption and outside air temperature data to identify a maximum outside air temperature (i.e., for heating balance point $\hat{T}_{bH}$) or a minimum outside air temperature (i.e., for cooling balance point $\hat{T}_{bC}$) below or above which building energy consumption is a function of the outside air temperature.

According to another embodiment, energy use model module 314 uses an optimization scheme to determine the balance point or points. The optimization scheme may include an exhaustive search of the balance points, a gradient descent algorithm, and/or a generalized reduced gradient (GRG) method to estimate balance points $\hat{T}_{bC}$ and/or $\hat{T}_{bH}$. In some embodiments, energy use model module 314 identifies the balance points using an iteratively reweighted least squares regression method. For example, energy use model module 314 may search for balance points that minimize the sum of squared error RSS of the building energy use model, where $$RSS = \sum_{i=1}^{n} \frac{\hat{e}_i^2}{t_i} \text{ and } \hat{e} = \|Y - X\hat{\beta}\|.$$

The model parameters $\theta$ may be expressed as a vector of estimates which includes the estimated regression coefficients and, in the three-parameter model, an estimated balance point. In a two-parameter model, the vector of estimates $\hat{\theta}$ may include only the estimated regression model coefficients $\hat{\beta}$ (e.g., $\hat{\theta}=\hat{\beta}$). In a three-parameter model, the vector of estimates $\hat{\theta}$ may include both the estimated regression model coefficients $\hat{\beta}$ and either a heating balance point estimate $\hat{T}_{bH}$ or a cooling balance point estimate $\hat{T}_{bC}$ (e.g., $\hat{\theta}=[\hat{\beta}\ \hat{T}_b]^T$, where $\hat{T}_b$ is either $\hat{T}_{bH}$ or $\hat{T}_{bC}$). Once the model parameters $\theta$ are estimated, energy use model module 314 may store the energy use model or models for use by other components of building analysis system 110.

Still referring to FIG. 3, memory 308 is shown to include a hypothesis testing module 316. Hypothesis testing module 316 may receive an energy use model for a building or building site. In some embodiments, the energy use model is generated by energy use model module 314, as previously described. In other embodiments, the energy use model may be received from another memory module, system, process, or otherwise obtained from any other data source.

In some embodiments, the energy use model is a linear regression model of the form $Y=X\beta+e$, where Y is a vector including n observations of building energy use E, X is a n×p matrix including p predictor variables, and $\beta$ is a vector of unknown model parameters. The predictor variables may include a weather-related predictor variable (e.g., outside air temperature $T_{OA}$, enthalpy, cooling degree days, heating degree days, heating energy days, cooling energy days, etc.). The values of the data in vector Y and matrix X (e.g., the building energy use E and the weather-related predictor variable) may be obtained from the building data stored in building data module 310 and/or the weather-related data stored in weather data module 312.

Hypothesis testing module 316 may be configured to evaluate the building energy use model (e.g., using hypothesis testing) to determine an appropriate parameter order for the building energy use model. Generally, a hypothesis test evaluates the validity of a hypothesis with respect to a set of data. For example, hypothesis testing module 316 may test a null hypothesis $H_0$ against an alternative hypothesis $H_a$ with respect to a set of building performance data (e.g., energy consumption data, weather-related data, etc.). Hypothesis testing generally results in one of two outcomes: rejection of the null hypothesis or failure to reject the null hypothesis. Failure to reject the null hypothesis does not necessarily mean that the null hypothesis is true. The null hypothesis $H_0$ should be selected such that rejection of the null hypothesis is meaningful.

Hypothesis testing module 316 may be configured to formulate a null hypothesis $H_0$ and an alternative hypothesis $H_a$. In some embodiments, hypothesis testing module 316 formulates a null hypothesis $H_0$ postulating that a two-parameter energy use model is appropriate for a particular building or building site. Under the null hypothesis $H_0$, the building energy use model may not have a variable parameter in the set of model parameters $\theta$ corresponding to a cooling balance point $T_{bC}$ (e.g., for a two-parameter cooling model) or a heating balance point $T_{bH}$ (e.g., for a two-parameter heating model). Under the null hypothesis $H_0$, either the cooling balance point $T_{bC}$ or the heating balance point $T_{bH}$ may be set to a fixed value. The fixed value may be a minimum of the outside air temperature or outside air enthalpy (e.g., for the cooling balance point $T_{bC}$) or a maximum of the outside air temperature or outside air enthalpy (e.g., for the heating balance point $T_{bH}$).

The fixed value of the balance point may be used as a substitute for the actual balance point when the actual balance point is unknown and the measured temperature and/or enthalpy data does not allow the balance point to be accurately determined. For example, the fixed value of the cooling balance point $T_{bC}$ may be used to indicate that the actual cooling balance point is less than or equal to the minimum measured outside air temperature/enthalpy. The fixed value of the heating balance point $T_{bH}$ may be used to indicate that the actual heating balance point is greater than or equal to the maximum measured outside air temperature/enthalpy.

In some embodiments, hypothesis testing module 316 formulates an alternative hypothesis $H_a$ postulating that a three-parameter energy use model is appropriate for the particular building or building site. Under the alternative hypothesis $H_a$, the building energy use model may include a variable parameter (e.g., in the set of model parameters θ) corresponding to a cooling balance point $T_{bC}$ (e.g., for a three-parameter cooling model) or a heating balance point $T_{bH}$ (e.g., for a three-parameter heating model). Under the alternative hypothesis, the cooling balance point $T_{bC}$ or the heating balance point $T_{bH}$ may be treated as an unknown parameter.

Still referring to FIG. 3, hypothesis testing module 316 is shown to include a regression statistic module 318 and a test statistic module 320. Hypothesis testing module 316 may use regression statistic module 318 and test statistic module 320 to test the null hypothesis $H_0$ against the alternative hypothesis $H_a$ in determining whether to reject the null hypothesis $H_0$.

Regression statistic module 318 may be configured to calculate a first regression statistic for the building energy use model under the null hypothesis $H_0$ and a second regression statistic for the building energy use model under the alternative hypothesis $H_a$. The regression statistics may indicate a fit of the energy use model to a plurality of data points under the null hypothesis $H_0$ and the alternative hypothesis $H_a$. The plurality of data points may include a plurality of observations of building energy use and a weather-related predictor variable. In some embodiments, regression statistic module 318 may obtain the plurality of data points from the building data stored in building data module 310 and/or the weather-related data stored in weather data module 312.

In some embodiments, the first regression statistic $RSS_1$ is a residual sum of squares under the null hypothesis $H_0$ and the second regression statistic $RSS_2$ is a residual sum of squares under the alternative hypothesis $H_a$. For example, regression statistic module 318 may calculate the first and second regression statistics according to the following equations:

$$RSS_1 = \sum_{i=1}^{n} \frac{\hat{e}_{1,i}^2}{t_i} \text{ and } RSS_2 = \sum_{i=1}^{n} \frac{\hat{e}_{2,i}^2}{t_i},$$

where $\hat{e}_1$ and $\hat{e}_2$ are the residuals resulting from regression under the null hypothesis $H_0$ and the alternative hypothesis $H_a$, respectively (e.g., $\hat{e}=\|Y-X\hat{\beta}\|$), t is the number of days per period, and n is the total number of observations.

In some embodiments, the first regression statistic $RSS_1$ and the second regression statistic $RSS_2$ follow a Chi-squared distribution. As described above, under the null hypothesis $H_0$, either the cooling balance point $T_{bC}$ or the heating balance point $T_{bH}$ may be set to a fixed value. However, under the alternative hypothesis $H_a$, the cooling balance point $T_{bC}$ or the heating balance point $T_{bH}$ may be treated as an unknown parameter. Thus, the degrees of freedom of $RSS_1$ may be equal to $df_1 = n-p$ whereas the degrees of freedom of $RSS_2$ may be equal to $df_2 = n-p-1$, where $df_1 > df_2$. The first regression statistic $RSS_1$ and the second regression statistic $RSS_2$ may follow a Chi-squared distribution such that $RSS_1 \sim \chi^2(n-p)$ and $RSS_2 \sim \chi^2(n-p-1)$.

Still referring to FIG. 3, test statistic module 320 may be configured to calculate a test statistic based on the first regression statistic $RSS_1$ and the second regression statistic $RSS_2$. In some embodiments, the test statistic is a ratio of (a) an improvement between the first regression statistic and the second regression statistic to (b) the second regression statistic divided by a number of degrees of freedom of the second regression statistic. For example, test statistic module 320 may calculate the test statistic $F_{test}$ using the following equation:

$$F_{test} = \frac{\frac{RSS_1 - RSS_2}{df_1 - df_2}}{\frac{RSS_2}{df_2}} \sim F(df_1 - df_2, df_2)$$

In some embodiments, the test statistic $F_{test}$ has an F-distribution with degrees of freedom $df_1 - df_2$ and $df_2$.

Test statistic module 320 may be configured to compare the test statistic $F_{test}$ with a threshold value. In some embodiments, the threshold value is retrieved from memory, specified by a user, or otherwise received from a separate system or process. In other embodiments, test statistic module 320 may calculate the threshold value. For example, test statistic module 320 may calculate the threshold value $F_{critical}$ using the following equation:

$$F_{critical} = F^{-1}(1-\alpha, df_1 - df_2, df_2)$$

where α is a significance level and $F^{-1}$ is the inverse of the F-distribution.

Significance level α is the probability of incorrectly rejecting the null hypothesis $H_0$ (i.e., incorrect rejection of a true null hypothesis). Significance level α may be modulated (e.g., between α=0 and α=1) to increase or decrease $F_{critical}$ and to adjust the level of improvement in $F_{test}$ that warrants rejecting the null hypothesis $H_0$. In various embodiments, significance level α may be 0.05, 0.10, or any other value for indicating various levels of improvement which may be considered significant. Significance level α may be retrieved from memory, specified by a user, or received from any other data source.

Still referring to FIG. 3, hypothesis testing module 316 may perform hypothesis testing using the test statistic $F_{test}$ and the threshold value $F_{critical}$. In some embodiments, hypothesis testing module 316 may compare the test statistic $F_{test}$ with the threshold value $F_{critical}$. If the test statistic is less than the threshold value (e.g., $F_{test} < F_{critical}$), hypothesis testing module 316 may determine that the hypothesis testing has failed to reject the null hypothesis $H_0$. Conversely, if the test statistic is not less than the threshold value (e.g., $F_{test} \geq F_{critical}$), hypothesis testing module 316 may determine that the hypothesis testing has rejected the null hypothesis $H_0$. Hypothesis testing module 316 may output or store a result of the hypothesis testing for use by parameter order determination module 322.

Still referring to FIG. 3, memory 308 is shown to include a parameter order determination module 322. Parameter order determination module 322 may be configured to determine an appropriate parameter order for the building energy use model based on a result of the hypothesis testing performed by hypothesis testing module 316. In some embodiments, failing to reject the null hypothesis $H_0$ may indicate that the parameter order corresponding to the alternative hypothesis $H_a$ is not significantly better for modeling the energy usage of the building or building site than the parameter order corresponding to the null hypothesis $H_0$ (e.g., the improvement between the first regression statistic $RSS_1$ and the second regression statistic $RSS_2$ is not significant). Conversely, rejecting the null hypothesis $H_0$ may indicate that the parameter order corresponding to the alternative hypothesis $H_a$ is significantly better for modeling the energy usage of the building or building site than the parameter order corresponding to the null hypothesis $H_0$ (e.g., the improvement between the first regression statistic $RSS_1$ and the second regression statistic $RSS_2$ is significant).

In some embodiments, parameter order determination module 322 may determine an appropriate parameter order based on the model parameter orders corresponding to the null hypothesis $H_0$ and/or the alternative hypothesis $H_a$. For example, if the null hypothesis $H_0$ corresponds to a two-parameter energy use model and the alternative hypothesis $H_a$ corresponds to a three-parameter energy use model, rejecting the null hypothesis $H_0$ may indicate that the three-parameter model is significantly better in describing the energy use of the building or building site than the two-parameter model.

In some embodiments, parameter order determination module 322 may determine that a two-parameter energy use model is appropriate in response to failing to reject the null hypothesis $H_0$. In some embodiments, parameter order determination module 322 may determine that a three-parameter energy use model is appropriate in response to rejecting the null hypothesis $H_0$. In other embodiments, parameter order determination module 322 may determine that any other parameter order is appropriate based on the parameter orders corresponding to the null hypothesis $H_0$ and/or the alternative hypothesis $H_a$.

In some embodiments, parameter order determination module 322 is configured to identify a current parameter order of the energy use model. Parameter order determination module 322 may compare the current parameter order with the appropriate parameter order to determine whether the current order matches the appropriate parameter order. Parameter order determination module 322 may be configured to update the energy use model with an energy use model having the appropriate parameter order in response to the current parameter order not matching the appropriate parameter order. For example, if the current energy use model for a building site is a three-parameter model and parameter order determination module 322 determines that a two-parameter model is appropriate, parameter order determination module 322 may update the current energy use model with a two-parameter energy use model. Parameter order determination module 322 may store and/or output an energy use model having the appropriate parameter order.

Still referring to FIG. 3, memory 308 is shown to include a performance analysis module 324. Performance analysis module 324 may be configured to analyze a building's energy performance using a building energy use model (e.g., the energy use model stored by parameter order determination module 322). Performance analysis module 324 may be configured to perform a variety of energy analysis functions including, for example, generating energy savings estimates, detecting outlier building sites with poor energy performance (e.g., by comparing similar building sites), and determining the effects of a fault on a building's energy consumption.

In some embodiments, performance analysis module 324 may perform energy analysis using a minimal amount of building performance data (e.g., a LEAN energy analysis). Performance analysis module 324 may rely on the number and value of parameters θ in the building energy use model to arrive at conclusions regarding a building's energy performance. By ensuring that the energy use model for a building has an appropriate number of parameters θ, the accuracy of the conclusions reached by performance analysis module 324 may be improved.

In some embodiments, performance analysis module 324 is configured to perform outlier detection. Performance analysis module 324 may be configured to compare one or more statistics of a test building to the probability distribution of those statistics for the other buildings in the same class (e.g., buildings having similar usage characteristics, buildings located in similar geographic regions, buildings modeled by energy use models having the same number of parameters, etc.). For example, performance analysis module 324 may determine that a building's statistic is an outlier for the class based on a number of standard deviations that the statistic is above or below the mean for the class distribution. In various embodiments, performance analysis module 324 may use any number of outlier detection techniques to identify an outlier value. For example, performance analysis module 324 may use a generalized extreme studentized deviate test (GESD), Grubb's test, or any other form of univariate outlier detection technique. In some embodiments, performance analysis module 324 may identify a building as an outlier if the statistic for the building is within a fixed percentage of the minimum or maximum for the class distribution (e.g., top 5%, bottom 5%, top 10%, etc.).

In some embodiments performance analysis module 324 may use a distance value between statistics to detect an outlier. For example, performance analysis module 324 may determine a Gaussian or Mahalanobis distance to compare statistics. Such a distance may represent a statistical distance away from the typical building in the class. If the Mahalanobis distance for a test building is above a critical value, performance analysis module 324 may generate an indication that the building's one or more statistics are outliers in relation to the other buildings in the class. In some embodiments, performance analysis module 324 may project the distance onto the vector directions defining changes in a building's parameters to determine the root cause. Other outlier detection techniques that may be used by performance analysis module 324 include, but are not limited to, Wilkes' method (e.g., if multivariate analysis is used) and various cluster analysis techniques.

Performance analysis module 324 may be configured to detect excessive energy consumption by a building. In some embodiments, performance analysis module 324 may perform one or more hypothesis tests using the building data stored in building data module 310 and the energy use model stored by parameter order determination module 322 and/or energy use model module 314 to detect excessive energy consumption. Exemplary hypothesis tests include F-tests and Chi-squared tests. In some embodiments, hypothesis testing may be used to test one or more values against a baseline, as described in U.S. patent application Ser. No. 13/252,092 entitled "Systems and Methods for Detecting Changes in Energy Usage In a Building" and filed on Oct. 3, 2011, the entirety of which is incorporated by reference herein.

In some embodiments, performance analysis module 324 may be configured to determine the effects of a fault on a building's energy consumption. In various embodiments, performance analysis module 324 may determine one or more changes to the model parameters of the energy use model (e.g., changes to the parameters in parameter vector β) that result when a particular fault is present. For example, performance analysis module 324 may determine changes to the vector of model parameters β that result from a damper being stuck in the open position. In one embodiment, performance analysis module 324 uses a simulation model to determine the changes to the energy use model parameters. In another embodiment, performance analysis module 324 determines a mapping between changes to a building's energy use model parameters and its physical parameters (e.g., the building's cooling slope $S_C$, heating slope $S_H$, cooling balance point $T_{bC}$, etc).

Performance analysis module 324 may provide the changes to the energy use model parameters to energy use model module 314. Energy use model module 314 may then determine a corresponding change to the building's energy consumption. For example, a stuck damper of an AHU may cause a building's normalized annual energy consumption to increase by 25,000 kWh/year. Performance analysis module 324 may use this change in energy consumption to calculate a corresponding financial cost associated with the fault condition. For example, performance analysis module 324 may multiply the determined change in energy consumption by a price per unit energy (e.g., received from utility 114) to calculate a financial cost associated with the fault.

In some embodiments, performance analysis module 324 may be configured to perform fault detection and analysis of the building under study using the energy use model generated by energy use model module 314 and/or the updated energy model stored by parameter order determination module 322. In one embodiment, performance analysis module 324 may monitor changes to the building's energy use model's parameters over time to detect potential faults. In another embodiment, performance analysis module 324 may perform fault detection using peer analysis with other buildings in its class to detect potential faults. For example, buildings having outlier model parameter changes may be identified as having potential faults. If a potential fault is detected, performance analysis module 324 may use a mapping between energy use model parameters and the building's physical parameters to determine the cause of the fault. Advantageously, determining an appropriate order for the building energy use model (e.g., by parameter order determination module 322) may facilitate the various energy analysis functions performed by performance analysis module 324.

Still referring to FIG. 3, memory 308 is shown to include an output and client request module 326. Output and client request module 326 may be configured to process user input received via communications interface 302 and/or user interface I/O 303. For example, output and client request module 326 may process a user request for information regarding the parameter order or appropriate parameter order for a specific building energy use model. As another example, output and client request module 326 may process a user request to run a performance analysis and/or generate an analytical performance analysis report for a particular building or building system. Output and client request module 326 may be configured to run or query parameter order determination module 322, energy use model module 314, performance analysis module 324, or any other component of building analysis system 110 to determine a response to the user request.

Output and client request module 326 may be configured to generate an output for presentation to a user. Output and client request module 326 may generate a graphical display, a visual display, a textual display, or any other type of user-comprehensible output. Output and client request module 326 may communicate a result of a user query/request (e.g., an appropriate parameter order of a particular building energy use model, an analytical report, etc.), a result of an intermediate processing step (e.g., a test statistic or regression statistic value, etc.), a result of a performance analysis, a result of a fault detection analysis, or any other data stored or used by building analysis system 110. In various embodiments, output and client request module 326 may generate display data for presentation via a local display (e.g., to a local user interacting with building analysis system 110 via user interface I/O 303), or may communicate output data to a remote user via communications interface 302 (e.g., a user interacting with building analysis system 110 via a network connection and/or a remote client).

Still referring to FIG. 3, memory 308 is shown to include a building control services module 328. Building control services module 328 may be configured to control one or more buildings, building systems, or building subsystems using a building energy use model. For example, building control services module 328 may utilize closed loop control, feedback control, PI control, model predictive control, or any other type of automated building control methodology that relies on a model to translate an input into an output. In some embodiments, building control services module 328 uses the building energy use model updated by parameter order determination module 322 to have the appropriate model parameter order to translate an input received from a building system into an output or control signal for the building system.

Building control services module 328 may receive inputs from sensory devices (e.g., temperature sensors, pressure sensors, flow rate sensors, humidity sensors, electric current sensors, cameras, radio frequency sensors, microphones, etc.), user input devices (e.g., computer terminals, client devices, user devices, etc.) or other data input devices via communications interface 302 and/or user interface I/O 303. Building control services module 328 may apply the various inputs to a building energy use model to determine an output for one or more building control devices (e.g., dampers, air handling units, chillers, boilers, fans, pumps, etc.) in order to affect a variable state or condition within a building or building system associated with the building energy use model (e.g., zone temperature, humidity, air flow rate, etc.). Building control services module 328 may operate the building or building system to maintain building conditions (e.g., temperature, humidity, air quality, etc.) within a setpoint range, to optimize energy performance (e.g., to minimize energy consumption, to minimize energy cost, etc.), and/or to satisfy any constraint or combination of constraints as may be desirable for various implementations.

Figure 4:
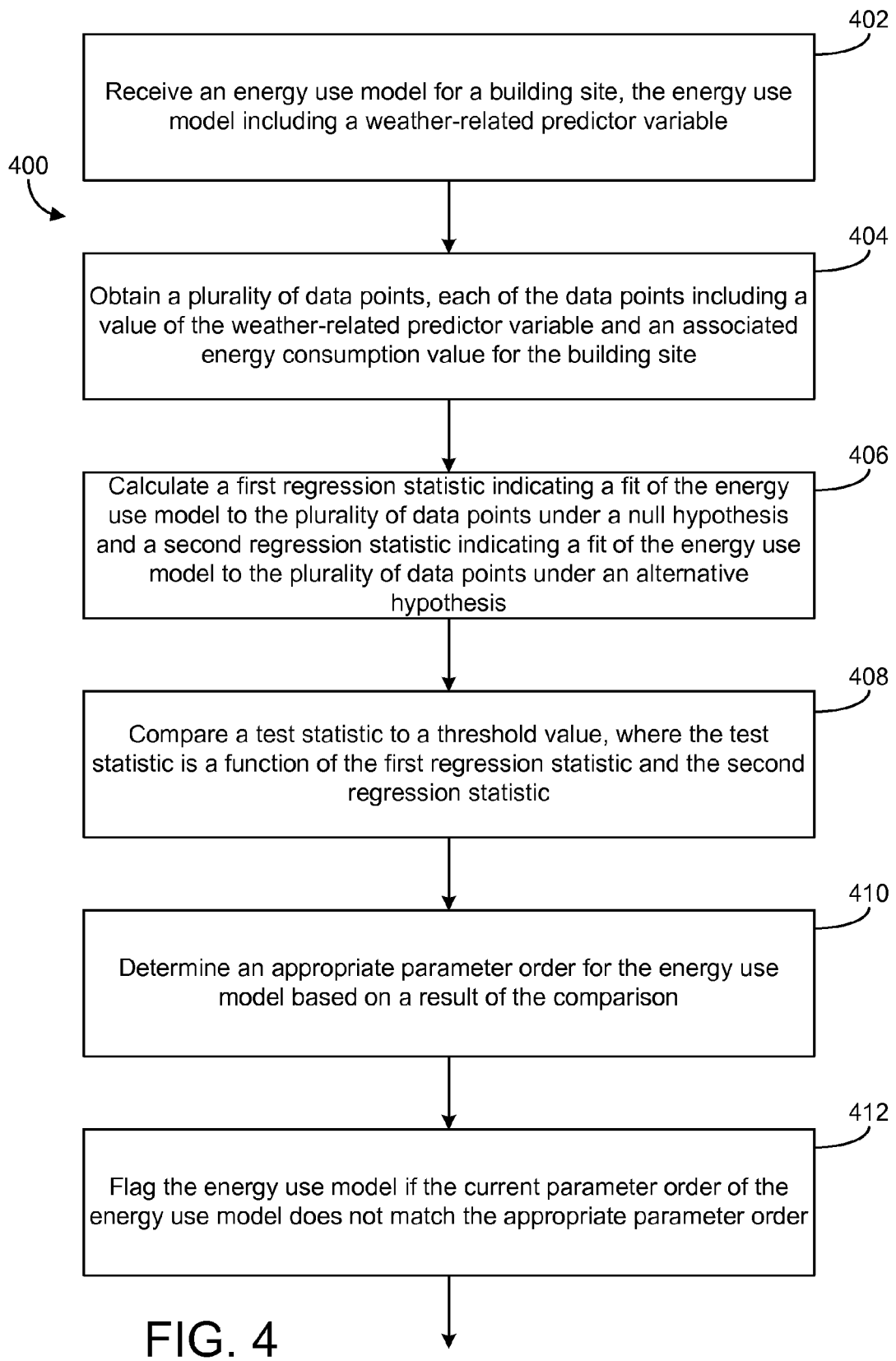
FIG. 4 is a flowchart of a process for determining an appropriate parameter order for a building energy use model is shown, according to an exemplary embodiment.
Figure 4:
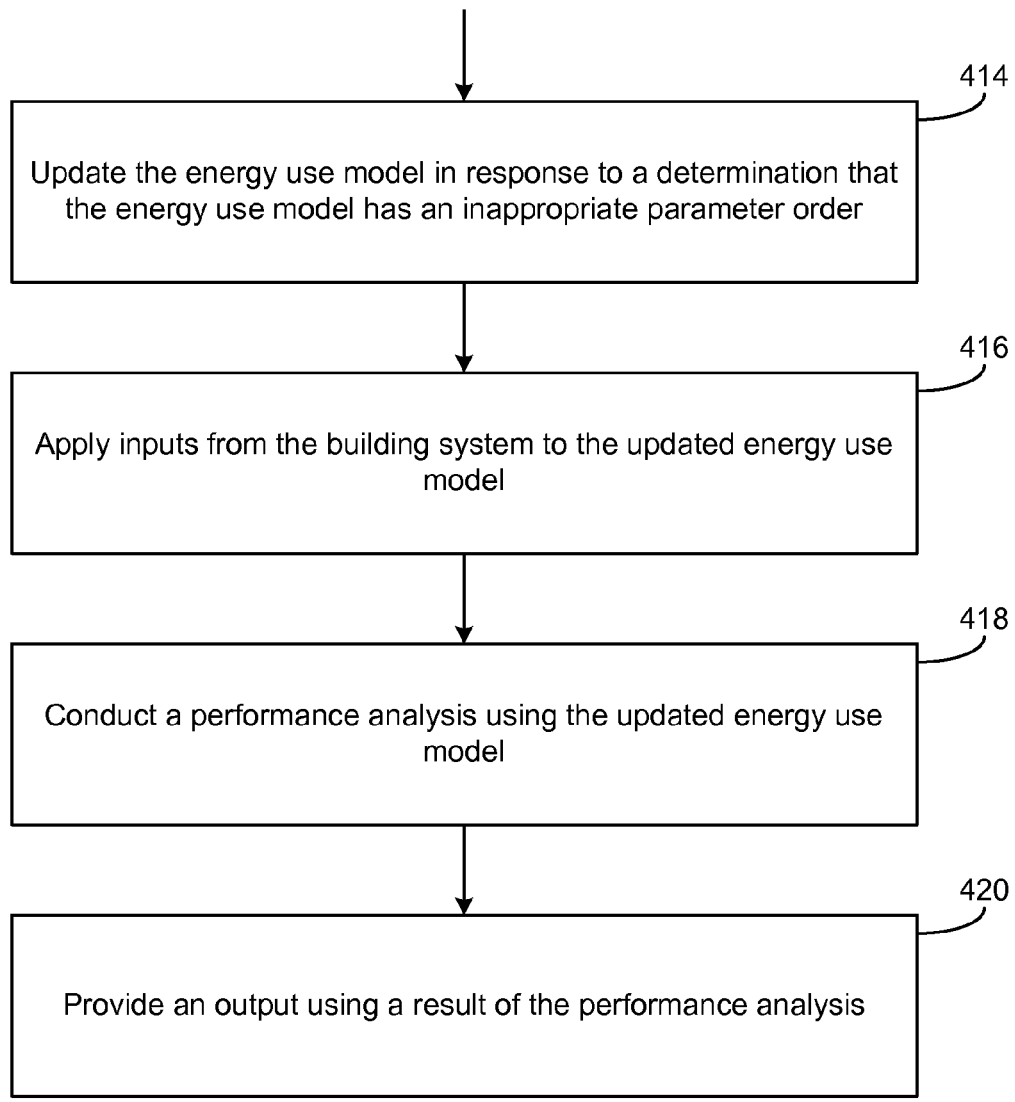

Referring now to FIG. 4, a flowchart of a process 400 for determining an appropriate parameter order for a building energy use model is shown, according to an exemplary embodiment. In some embodiments, process 400 is performed by building analysis system 110 using one or more of memory modules 310-324, as described with reference to FIG. 3. In some embodiments, process 400 may be used to determine whether a two-parameter energy use model or a three-parameter energy use model is appropriate for a particular building or building site.

Process 400 is shown to include receiving an energy use model for a building site (step 402). The energy use model may be of any form including parametric models (e.g., linear regression models, non-linear regression models, etc.), non-parametric models (neural networks, kernel estimation, hierarchical Bayesian, etc.), or something in between (e.g., Gaussian process models). In some embodiments, step 402 includes receiving an energy use model from an external source (e.g., via communications interface 302). In other embodiments, step 402 includes generating the energy use model (e.g., using the building data stored in building data module 310 and/or the weather data stored in weather data module 312).

In some embodiments, linear regression is used in step 402 to generate the energy use model. A linear regression model for a building site may be represented by the following equation:

$$Y = X\beta + e,$$

where $Y \in \Re^{n \times 1}$ is the site's energy consumption, $X \in \Re^{n \times p}$ is a predictor variable matrix, $\beta \in \Re^{p \times 1}$ is a vector of unknown regression coefficients, and e is the model error such that $e \sim N(0, t_i \sigma^2)$. The predictor variable matrix X may have a size of n×p where p is the total number of predictor variables (e.g., including the number of days per period $t=[t_1 \ldots t_n]^T$) and n is the total number of observations.

In some embodiments, the energy use model includes a weather-related predictor variable (e.g., outside air temperature $T_{OA}$, enthalpy, cooling degree days, heating degree days, heating energy days, cooling energy days, etc.). In some embodiments, the energy use model includes only one weather-related predictor variable. In some embodiments, the energy use model includes one or more non-weather-related predictor variables. Non-weather-related predictor variables may include, for example, water consumption, building occupancy, days off, the number of days per period t, and/or any other variable which may affect the site's energy consumption. The weather-related predictor variable and/or other predictor variables may be included in predictor variable matrix X.

In some embodiments, generating a linear regression energy use model includes estimating the values of the regression coefficients in vector β. Any of a variety of different estimation techniques may be used to estimate the values of the regression coefficients in vector β. In some embodiments, step 402 includes using a partial least squares regression (PLSR) method. In other embodiments, other methods (e.g., ridge regression (RR), principal component regression (PCR), weighted least squares regression (WLSR), ordinary least squares regression (OLSR), etc.) may be used to estimate the values of the regression coefficients in vector β.

Still referring to FIG. 4, process 400 is shown to include obtaining a plurality of data points (step 404). Each of the data points may include a value of the weather-related predictor variable and an associated energy consumption value for the building site. In some embodiments, the plurality of data points are received prior to generating the energy use model and may be used to perform the linear regression described with reference to step 402.

The weather-related predictor variable may be any variable that has a weather-related value (e.g., outside air temperature $T_{OA}$, enthalpy, humidity, pressure, wind speed, precipitation level, etc.) or any variable that depends on a weather-related value. In some embodiments, the weather-related predictor variable may be calculated based on one or more weather-related values. In some embodiments, step 404 includes receiving at least one of an observed temperature value and an observed enthalpy value and calculating the value of the weather-related predictor variable using the observed temperature value or the observed enthalpy value.

For example, the weather-related predictor variable may be a cooling degree day (CDD) value, a heating degree day (HDD) value, a cooling energy day (CED) value, or a heating energy day (HED) value. A CDD or HDD value may generally represent the amount of heating or cooling needed by the building over a period of time. In some embodiments, the CDD and HDD values for a building may be calculated by integrating the difference between the outside air temperature $T_{OA}$ of the building and a given temperature over a period of time. The given temperature may be a cooling balance point for the building (e.g., cooling balance point $T_{bC}$) to determine a CDD value, or heating balance point for the building (e.g., heating balance point $T_{bH}$) to determine a HDD value. For example, CDD and HDD values for the building over the course of a month may be calculated as follows:

$$CDD = \int^{month} Max\{0, (T_{OA} - T_{bC})\} dt$$

$$HDD = \int^{month} Max\{0, (T_{bH} - T_{OA})\} dt$$

In other embodiments, a set reference temperature may be used to calculate a building's CDD or HDD value instead of the building's actual balance point. For example, a reference temperature of 65° F. may be used as a fixed value to compare with the building's outdoor air temperature. CED and HED values may be calculated in a similar manner using outside air enthalpy rather than outside air temperature $T_{OA}$.

Still referring to FIG. 4, process 400 is shown to include calculating a first regression statistic indicating a fit of the energy use model to the plurality of data points under a null hypothesis $H_0$ and a second regression statistic indicating a fit of the energy use model to the plurality of data points under an alternative hypothesis $H_a$ (step 406).

The null hypothesis $H_0$ may postulate that a two-parameter energy use model is appropriate for a particular building or building site. In some embodiments, under the null hypothesis $H_0$, the building energy use model may not have a variable parameter in θ corresponding to a cooling balance point $T_{bC}$ (e.g., for a two-parameter cooling model) or a heating balance point $T_{bH}$ (e.g., for a two-parameter heating model). In other embodiments, under the null hypothesis $H_0$, either the cooling balance point $T_{bC}$ or the heating balance point $T_{bH}$ may be set to a fixed value. The fixed value may be a minimum of the measured values for outdoor air temperature or enthalpy (e.g., for the cooling balance point $T_{bC}$) or a maximum of the measured values for outdoor air temperature or enthalpy (e.g., for the heating balance point $T_{bH}$).

The alternative hypothesis $H_a$ may postulate that a three-parameter energy use model is appropriate for the particular building or building site. Under the alternative hypothesis $H_a$, the building energy use model may include a variable parameter in θ corresponding to a cooling balance point $T_{bC}$ (e.g., for a three-parameter cooling model) or a heating balance point $T_{bH}$ (e.g., for a three-parameter heating model). Under the alternative hypothesis, the cooling balance point $T_{bC}$ or the heating balance point $T_{bH}$ may be treated as an unknown parameter.

The first regression statistic and the second regression statistic may be represented by $RSS_1$ and $RSS_2$, respectively. In some embodiments, $RSS_1$ and $RSS_2$ are calculated by regression statistic module 318, as previously described with reference to FIG. 3. In some embodiments, the first regression statistic $RSS_1$ is a residual sum of squares under the null hypothesis $H_0$ and the second regression statistic $RSS_2$ is a residual sum of squares under the alternative hypothesis $H_a$. For example, $RSS_1$ and $RSS_2$ may be calculated using the following equations:

$$RSS_1 = \sum_{i=1}^{n} \frac{\hat{e}_{1,i}^2}{t_i} \text{ and } RSS_2 = \sum_{i=1}^{n} \frac{\hat{e}_{2,i}^2}{t_i},$$

where $\hat{e}_1$ and $\hat{e}_2$ are the residuals resulting from regression under the null hypothesis $H_0$ and the alternative hypothesis $H_a$, respectively (e.g., $\hat{e} = \|Y - X\hat{\beta}\|$), t is the number of days per period, and n is the total number of observations.

The degrees of freedom of $RSS_1$ may be equal to $df_1 = n-p$ and the degrees of freedom of $RSS_2$ may be equal to $df_2 = n-p-1$, where $df_1 > df_2$. The first regression statistic $RSS_1$ and the second regression statistic $RSS_2$ may follow a Chi-squared distribution such that $RSS_1 \sim \chi^2(n-p)$ and $RSS_2 \sim \chi^2(n-p-1)$.

Still referring to FIG. 4, process 400 is shown to include comparing a test statistic to a threshold value (step 408). Step 408 may be performed by test statistic module 320, as previously described with reference to FIG. 3. The test statistic may be a function of the first regression statistic $RSS_1$ and the second regression statistic $RSS_2$. In some embodiments, the test statistic is a ratio of (a) an improvement between the first regression statistic $RSS_1$ and the second regression statistic $RSS_2$ to (b) the second regression statistic $RSS_2$ divided by a number of degrees of freedom of the second regression statistic $df_2$.

In some embodiments, the test statistic is specified by a user or received as an input to process 400. In other embodiments, step 408 includes calculating the test statistic. For example, the test statistic $F_{test}$ may be calculated using the following equation:

$$F_{test} = \frac{\frac{RSS_1 - RSS_2}{df_1 - df_2}}{\frac{RSS_2}{df_2}} \sim F(df_1 - df_2, df_2)$$

In some embodiments, the test statistic $F_{test}$ has an F-distribution with degrees of freedom $df_1 - df_2$ and $df_2$.

Step 408 may include receiving a threshold value. In some embodiments, the threshold value is retrieved from memory, specified by a user, or otherwise received from a separate system or process. In other embodiments, step 408 includes calculating the threshold value. For example, the threshold value $F_{critical}$ may be calculated using the following equation:

$$F_{critical} = F^{-1}(1-\alpha, df_1 - df_2, df_2)$$

where $\alpha$ is a significance level and $F^{-1}$ is the inverse of the F-distribution.

Significance level $\alpha$ is the probability of incorrectly rejecting the null hypothesis $H_0$ (i.e., incorrect rejection of a true null hypothesis). Significance level $\alpha$ may be modulated (e.g., between $\alpha=0$ and $\alpha=1$) to increase or decrease $F_{critical}$ and to adjust the level of improvement in $F_{test}$ that is warrants rejecting the null hypothesis $H_0$. In various embodiments, significance level $\alpha$ may be 0.05, 0.10, or any other value for indicating various levels of improvement which may be considered significant. Significance level $\alpha$ may be retrieved from memory, specified by a user, or received from any other data source.

Still referring to FIG. 4, process 400 is shown to include determining an appropriate parameter order for the energy use model based on a result of the comparison (step 410). In some embodiments, step 410 includes rejecting the null hypothesis $H_0$ if the result of the comparison reveals that test statistic is not less than the threshold value (e.g., $F_{test} \geq F_{critical}$). In some embodiments, step 410 includes failing to reject the null hypothesis $H_0$ if the result of the comparison reveals that the test statistic is less than the threshold value (e.g., $F_{test} < F_{critical}$).

In some embodiments, failing to reject the null hypothesis $H_0$ may indicate that the parameter order corresponding to the alternative hypothesis $H_a$ is not significantly better for modeling the energy usage of the building or building site than the parameter order corresponding to the null hypothesis $H_0$ (e.g., the improvement between the first regression statistic $RSS_1$ and the second regression statistic $RSS_2$ is not significant). Conversely, rejecting the null hypothesis $H_0$ may indicate that the parameter order corresponding to the alternative hypothesis $H_a$ is significantly better for modeling the energy usage of the building or building site than the parameter order corresponding to the null hypothesis $H_0$ (e.g., the improvement between the first regression statistic $RSS_1$ and the second regression statistic $RSS_2$ is significant).

In some embodiments, step 410 includes determining that a two-parameter energy use model is appropriate in response to failing to reject the null hypothesis $H_0$. In some embodiments, step 410 includes determining that a three-parameter energy use model is appropriate in response to rejecting the null hypothesis $H_0$. In some embodiments, step 410 includes identifying the building site as at least one of: a building site for which heating is not required and a building site for which cooling is not required if the null hypothesis $H_0$ is rejected.

The identification of the building site as a site for which heating or cooling is not required may be specific to the range of outside air temperatures and/or enthalpies represented in the weather data and specific to the sources of energy consumption modeled in the building energy use model. For example, identifying a building site as a site for which heating or cooling is not required may indicate that there is no range of temperatures in the measured weather data for which the energy consumption represented in the energy use model is not a function of outside air temperature (e.g., no flat region in the graph shown in FIG. 2). Thus, an identification of a building site as a site for which heating or cooling is not required may indicate only that the sources of energy consumption modeled in the building energy use model are not needed to heat or cool the building for the range of temperatures and/or enthalpies represented in the measured weather data upon which the energy consumption model is based. Other sources of heating or cooling not captured in the energy use model may be used to provide heating or cooling for the building site.

Still referring to FIG. 4, process 400 is shown to include flagging the energy use model if the current parameter order of the energy use model does not match the appropriate parameter order (step 412). Step 412 may include identifying a current parameter order of the energy use model and comparing the current parameter order with the appropriate parameter order. For example, if the current energy use model for a building site is a three-parameter model and it is determined in step 410 that a two-parameter model is appropriate, step 412 may include flagging, marking, tagging, or otherwise indicating that the current energy use model has an inappropriate parameter order. In some embodiments, step 412 may be performed when the null hypothesis $H_0$ is rejected. Step 412 may include outputting and/or storing an energy use model having the appropriate parameter order.

Still referring to FIG. 4, process 400 is shown to include updating the energy use model in response to a determination that the energy use model has an inappropriate parameter order (step 414). In various embodiments, step 414 may include determining whether the energy use model was flagged as having an inappropriate parameter order in step 412, determining whether the current parameter order of the energy use model matches the appropriate parameter order for the energy use model, determining whether the null hypothesis $H_0$ is rejected, or any other determination that would indicate that the current model parameter order is inappropriate.

Step 414 may include updating the current energy use model with an energy use model that has the appropriate parameter order. For example, if the current energy use model for a building site is a three-parameter model and it is determined in step 410 that a two-parameter model is appropriate, step 414 may include updating the energy use model to be a two-parameter model. Step 414 may include adding one or more parameters to the energy use model, subtracting/removing one or more parameters from the energy use model, and/or updating the value of one or more existing parameters in the building energy use model.

Still referring to FIG. 4, process 400 is shown to include applying inputs to the updated energy use model (step 416). Inputs may include, for example, inputs from sensory devices (e.g., temperature sensors, pressure sensors, flow rate sensors, humidity sensors, electric current sensors, cameras, radio frequency sensors, microphones, etc.), user input devices (e.g., computer terminals, client devices, user devices, etc.) or other data input devices via communications interface 302 and/or user interface I/O 303. Inputs may include measured variables indicating a current state or condition within a building or building system, setpoints, constraint conditions, control parameters, operating schedules, or other measured, calculated, or user-defined inputs.

Step 416 may include using the updated energy use model to translate the inputs into an output or control signal for the building system. For example, step 416 may include using closed loop control, feedback control, PI control, model predictive control, or any other type of automated building control methodology that relies on a model to translate an input into an output or control signal. In some embodiments, step 416 includes using a building energy use model that has been updated to have the appropriate model parameter order to translate an input received from a building system into an output or control signal for the building system.

Step 416 may include applying the various inputs to a building energy use model to determine an output for one or more building control devices (e.g., dampers, air handling units, chillers, boilers, fans, pumps, etc.) in order to affect a variable state or condition within a building or building system associated with the building energy use model (e.g., zone temperature, humidity, air flow rate, etc.). Step 416 may include operating the building or building system to maintain building conditions (e.g., temperature, humidity, air quality, etc.) within a setpoint range, to optimize energy performance (e.g., to minimize energy consumption, to minimize energy cost, etc.), and/or to satisfy any constraint or combination of constraints as may be desirable for various implementations.

Still referring to FIG. 4, process 400 is shown to include conducting a performance analysis using the updated energy use model (step 418). In some embodiments, step 418 is performed by performance analysis module 324 as previously described with reference to FIG. 3. Step 418 may include analyzing a building's energy performance using the updated building energy use model to generate energy savings estimates, detect outlier building sites with poor energy performance (e.g., by comparing similar building sites), determine the effects of a fault on a building's energy consumption, or perform other energy analysis tasks In some embodiments, step 418 includes performing an energy analysis using a minimal amount of building performance data (e.g., a LEAN energy analysis). Step 418 may include using the number and value of parameters $\theta$ in the building energy use model to arrive at conclusions regarding a building's energy performance. By ensuring that the energy use model for a building has an appropriate number of parameters, the accuracy of the conclusions reached in step 418 may be improved.

In some embodiments, step 418 includes performing outlier detection. For example, step 418 may include comparing one or more statistics of a test building to the probability distribution of those statistics for the other buildings in the same class (e.g., buildings having similar usage characteristics, buildings located in similar geographic regions, buildings modeled by energy use models having the same number of parameters, etc.). Step 418 may include determining that a building's statistic is an outlier for the class based on a number of standard deviations that the statistic is above or below the mean for the class distribution. In various embodiments, step 418 includes using any number of outlier detection techniques to identify an outlier value. For example, step 418 may include using a generalized extreme studentized deviate test (GESD), Grubb's test, or any other form of univariate outlier detection technique. In some embodiments, step 418 includes identifying a building as an outlier if the statistic for the building is within a fixed percentage of the minimum or maximum for the class distribution (e.g., top 5%, bottom 5%, top 10%, etc.).

In some embodiments step 418 includes using a distance value between statistics to detect an outlier. For example, step 418 may include determining a Mahalanobis distance to compare statistics. Such a distance may represent a statistical distance away from the typical building in the class. If the Mahalanobis distance for a test building is above a critical value, step 418 may include generating an indication that the building's one or more statistics are outliers in relation to the other buildings in the class. In some embodiments, step 418 includes projecting the distance onto the vector directions defining changes in a building's parameters to determine the root cause. Other outlier detection techniques that may be used in step 418 include, but are not limited to, Wilkes' method (e.g., if multivariate analysis is used) and various cluster analysis techniques.

Step 418 may include detecting excessive energy consumption by a building. In some embodiments, step 418 includes performing one or more hypothesis tests using the building data stored in building data module 310 and the energy use model stored by parameter order determination module 322 and/or energy use model module 314 to detect excessive energy consumption. Exemplary hypothesis tests include F-tests and Chi-squared tests. In some embodiments, hypothesis testing may be used to test one or more values against a baseline.

In some embodiments, step 418 includes determining the effects of a fault on a building's energy consumption. In various embodiments, step 418 includes determining one or more changes to the model parameters $\theta$ of the energy use model that result when a particular fault is present. For example, step 418 may include determining changes to the model parameters $\theta$ that result from a damper being stuck in the open position. In one embodiment, step 418 includes using a simulation model to determine the changes to the energy use model parameters $\theta$. In another embodiment, step 418 includes determining a mapping between changes to a building's energy use model parameters and its physical parameters (e.g., the building's cooling slope $S_C$, heating slope $S_H$, cooling balance point $T_{bC}$, etc.). In some embodiments, only the regression coefficients in vector$\beta$ $\beta$ are used in fault detection and peer analysis regardless of whether the energy use model is a two-parameter model or a three-parameter model. However, knowing whether the data correspond to a two-parameter model or a three-parameter model may yield more reliable values for the regression model coefficients $\beta$, thereby providing a more reliable fault detection or peer analysis.

Step 418 may include providing the changes to the energy use model parameters to energy use model module 314. Energy use model module 314 may then determine a corresponding change to the building's energy consumption. For example, a stuck damper of an AHU may cause a building's normalized annual energy consumption to increase by 25,000 kWh/year. Performance analysis module 324 may use this change in energy consumption to calculate a corresponding financial cost associated with the fault condition. For example, performance analysis module 324 may multiply the determined change in energy consumption by a price per unit energy (e.g., received from utility 114) to calculate a financial cost associated with the fault.

In some embodiments, step 418 includes performing fault detection and analysis of the building under study using the updated building energy use model. In one embodiment, step 418 includes monitoring changes to the building's energy use model's parameters over time to detect potential faults. In another embodiment, step 418 includes performing fault detection using peer analysis with other buildings in its class to detect potential faults. For example, buildings having outlier model parameter changes may be identified as having potential faults. If a potential fault is detected, step 418 may include using a mapping between energy use model parameters and the building's physical parameters to determine the cause of the fault. Advantageously, determining an appropriate order for the building energy use model (e.g., by parameter order determination module 322) may facilitate the various energy analysis functions performed in step 418.

Still referring to FIG. 4, process 400 is shown to include providing an output using a result of the performance analysis (step 420). In some embodiments, step 420 includes generating display data for presentation to a user via a local display (e.g., to a local user interacting with building analysis system 110 via user interface I/O 303). In some embodiments, step 420 includes communicating a result of the performance analysis to a remote user, system, or device via communications interface 302 (e.g., a user interacting with building analysis system 110 via a network connection and/or a remote client). Step 420 may include generating an output for presentation to a user in a user-comprehensible format (e.g., visual display, graphical display, textual display, etc.) and/or storing a result of the performance analysis in a data storage device.

In some embodiments, step 420 includes using a result of the performance analysis to determine or change an output or control signal provided to a building system device. Step 420 may include providing the output for one or more building control devices (e.g., dampers, air handling units, chillers, boilers, fans, pumps, etc.) in order to affect a variable state or condition within a building or building system associated with the building energy use model (e.g., zone temperature, humidity, air flow rate, etc.). Step 420 may include operating the building or building system to maintain building conditions (e.g., temperature, humidity, air quality, etc.) within a setpoint range, to optimize energy performance (e.g., to minimize energy consumption, to minimize energy cost, etc.), and/or to satisfy any constraint or combination of constraints as may be desirable for various implementations.

Embodiments of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on one or more computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium may be tangible and non-transitory.

The operations described in this specification can be implemented as operations performed by a data processing apparatus on data stored on one or more computer-readable storage devices or received from other sources.

The term "client or "server" include all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube), LCD (liquid crystal display), OLED (organic light emitting diode), TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an embodiment of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific embodiment details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product embodied on a tangible medium or packaged into multiple such software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain embodiments, multitasking and parallel processing may be advantageous.

What is claimed is:

1. A method for determining an appropriate parameter order for an energy use model for a building site, the method comprising:
  receiving an energy use model for the building site at a communications interface of a building analysis system, the energy use model comprising a weather-related predictor variable;
  obtaining, by a processing circuit of the building analysis system, a plurality of data points, each of the data points comprising a value of the weather-related predictor variable and an associated energy consumption value for the building site;
  calculating, by the processing circuit, a first regression statistic indicating a fit of the energy use model to the plurality of data points under a null hypothesis that the energy use model has a first parameter order and a second regression statistic indicating a fit of the energy use model to the plurality of data points under an alternative hypothesis that the energy use model has a second parameter order different from the first parameter order;
  generating, by the processing circuit, a test statistic that is a ratio comprising an improvement between the first regression statistic and the second regression statistic;
  comparing, by the processing circuit, the test statistic to a threshold value to determine whether the improvement warrants rejecting the null hypothesis;
  determining, by the processing circuit, an appropriate parameter order for the energy use model based on a result of the comparison; receiving, at the processing circuit, inputs from one or more sensors that measure a variable state or condition of the building site;
  using the energy use model with the appropriate parameter order to generate, by the processing circuit, control signals for one or more building control devices as a function of the inputs from the sensors;
  and operating the building control devices according to the control signals, wherein operating the building control devices affects the variable state or condition of the building site.

2. The method of claim 1, wherein obtaining the plurality of data points comprises, for each of the data points:
receiving at least one of: an observed temperature value and an observed enthalpy value; and
calculating the value of the weather-related predictor variable using the observed temperature value or the observed enthalpy value.

3. The method of claim 1, wherein the energy use model includes a balance point parameter under the alternative hypothesis and does not include a balance point parameter under the null hypothesis.

4. The method of claim 3, wherein the balance point parameter is at least one of:
a temperature parameter having a temperature value between a minimum and a maximum of a plurality of observed temperature values, and
an enthalpy parameter having an enthalpy value between a minimum and a maximum of a plurality of observed enthalpy values.

5. The method of claim 1, further comprising analyzing energy consumption data and weather data to identify a balance point parameter for use in the energy use model, wherein:
under the null hypothesis, the balance point parameter is identified by using an extremum of the weather data as the balance point parameter; and
under the alternative hypothesis, the balance point parameter is identified by determining a range of the weather data within which the energy consumption data is a function of the weather data and using an extremum of the determined range as the balance point parameter.

6. The method of claim 3, wherein the value of the weather-related predictor variable is a function of the balance point parameter.

7. The method of claim 1, wherein the weather-related predictor variable is at least one of: cooling degree days, heating degree days, cooling energy days, heating energy days, temperature, and enthalpy.

8. The method of claim 1, wherein the energy use model under the null hypothesis is nested within the energy use model under the alternative hypothesis.

9. The method of claim 1, wherein the first regression statistic is a sum of squared error under the null hypothesis and the second regression statistic is a sum of squared error under the alternative hypothesis,
wherein the sum of squared error is a function of a difference between an energy consumption of the building site predicted by the energy use model and an actual energy consumption of the building site.

10. The method of claim 1, wherein the test statistic is a ratio of (a) an improvement between the first regression statistic and the second regression statistic to (b) the second regression statistic divided by a number of degrees of freedom of the second regression statistic.

11. The method of claim 1, further comprising:
identifying a significance level; and
calculating the threshold value, wherein the threshold value is a function of the identified significance level.

12. The method of claim 11, wherein the function of the identified significance level is an inverse F-distribution function based on:
the identified significance level;
a difference between a number of degrees of freedom of the first regression statistic and a number of degrees of freedom of the second regression statistic; and
number of degrees of freedom of the second regression statistic.

13. The method of claim 1, wherein determining the appropriate parameter order for the energy use model comprises:
rejecting the null hypothesis if the result of the comparison reveals that test statistic is not less than the threshold value; and
failing to reject the null hypothesis if the result of the comparison reveals that the test statistic is less than the threshold value.

14. The method of claim 13, wherein determining the appropriate parameter order for the energy use model further comprises:
determining that a three-parameter model is appropriate in response to rejecting the null hypothesis; and
determining that a two-parameter model is appropriate in response to failing to reject the null hypothesis.

15. The method of claim 13, wherein determining an appropriate parameter order for the energy use model further comprises:
identifying a range of weather data values used by the energy use model to predict energy consumption; and
determining that the energy consumption predicted by the energy use model is a function of the weather data values for weather data values within the identified range.

16. The method of claim 13, wherein determining an appropriate parameter order for the energy use model further comprises:
in response to failing to reject the null hypothesis, identifying the building site as at least one of: a building site for which heating is not required and a building site for which cooling is not required.

17. The method of claim 1, further comprising:
identifying a current parameter order of the energy use model;
comparing the current parameter order with the appropriate parameter order;
updating the energy use model with an energy use model having the appropriate parameter order in response to the current parameter order not matching the appropriate parameter order; and
storing the energy use model for the building site, wherein the stored energy use model has the appropriate parameter order.

18. The method of claim 17, further comprising:
using the stored energy use model to perform a peer analysis of energy use model parameters for a class of buildings;
calculating a difference between an energy use model parameter of the stored energy use model and a mean of the energy use model parameters for the class of buildings; and
detecting an outlier model parameter based on a result of the calculation.

19. The method of claim 17, further comprising:
monitoring changes to one or more energy use model parameters in the stored energy use model;
detecting the existence of a fault condition using a monitored change to the energy use model parameters; and
determining a change to an energy consumption that results from the fault condition based on the change to the energy use model parameters.

20. The method of claim 1, further comprising:
updating the energy use model with an energy use model that has the appropriate parameter order;
applying inputs to the updated energy use model;
conducting a performance analysis using the updated energy use model; and providing an output using a result of the performance analysis.

21. A system for determining an appropriate parameter order for an energy use model for a building site, the system comprising:
one or more sensors that measure a variable state or condition of the building site;
a communications interface that receives an energy use model for the building site, the energy use model comprising a weather-related predictor variable;
a processing circuit comprising a processor and memory, wherein the processing circuit:
obtains a plurality of data points, each of the data points comprising a value of the weather-related predictor variable and an associated energy consumption value for the building site;
calculates a first regression statistic indicating a fit of the energy use model to the plurality of data points under a null hypothesis that that energy use model has a first parameter order and a second regression statistic indicating a fit of the energy use model to the plurality of data points under an alternative hypothesis that the energy use model has a second parameter order different from the first parameter order;
generates a test statistic that is a ratio comprising an improvement between the first regression statistic and the second regression statistic;
compares a test statistic to a threshold value to determine whether the improvement warrants rejecting the null hypothesis;
determines an appropriate parameter order for the energy use model based on a result of the comparison;
receives inputs from the one or more sensors that measure the variable state or condition of the building site; and
uses the energy use model with the appropriate parameter order to generate control signals as a function of the inputs from the sensors; and
building control devices that operate according to the control signals and affect the variable state or condition of the building site.

22. The system of claim 21, wherein obtaining the plurality of data points comprises, for each of the data points:
receiving at least one of: an observed temperature value and an observed enthalpy value; and
calculating the value of the weather-related predictor variable using the observed temperature value or the observed enthalpy value.

23. The system of claim 21, wherein the energy use model includes a balance point parameter under the alternative hypothesis and does not include a balance point parameter under the null hypothesis.

24. The system of claim 23, wherein the balance point parameter is at least one of:
a temperature parameter having a temperature value between a minimum and a maximum of a plurality of observed temperature values, and
an enthalpy parameter having an enthalpy value between a minimum and a maximum of a plurality of observed enthalpy values.

25. The system of claim 23, wherein the value of the weather-related predictor variable is a function of the balance point parameter.

26. The system of claim 21, wherein the first regression statistic is a sum of squared error under the null hypothesis and the second regression statistic is a sum of squared error under the alternative hypothesis,
wherein the sum of squared error is a function of a difference between an energy consumption of the building site predicted by the energy use model and an actual energy consumption of the building site.

27. The system of claim 21, wherein the processing circuit:
identifies a significance level; and
calculates the threshold value, wherein the threshold value is a function of the identified significance level.

28. The system of claim 21, wherein determining the appropriate parameter order for the energy use model comprises:
rejecting the null hypothesis if the result of the comparison reveals that test statistic is not less than the threshold value; and
failing to reject the null hypothesis if the result of the comparison reveals that the test statistic is less than the threshold value.

29. The system of claim 28, wherein determining the appropriate parameter order for the energy use model further comprises:
determining that a three-parameter model is appropriate in response to rejecting the null hypothesis; and
determining that a two-parameter model is appropriate in response to failing to reject the null hypothesis.

30. The system of claim 27, wherein determining an appropriate parameter order for the energy use model further comprises:
identifying a range of weather data values used by the energy use model to predict energy consumption; and
determining that the energy consumption predicted by the energy use model is a function of the weather data values for weather data values within the identified range.

31. The system of claim 28, wherein determining an appropriate parameter order for the energy use model further comprises:
in response to failing to reject the null hypothesis, identifying the building site as at least one of: a building site for which heating is not required and a building site for which cooling is not required.

32. The system of claim 21, wherein the processing circuit is further:
identifies a current parameter order of the energy use model;
compares the current parameter order with the appropriate parameter order;
updates the energy use model with an energy use model having the appropriate parameter order in response to the current parameter order not matching the appropriate parameter order; and
stores the energy use model for the building site, wherein the stored energy use model has the appropriate parameter order.

33. The system of claim 21, wherein the processing circuit:
updates the energy use model with an energy use model having the appropriate order;
applies inputs to the updated energy use model;
conducts a performance analysis using the updated energy use model; and
provides an output using a result of the performance analysis.

* * * * *